(12) United States Patent
Sorsby et al.

(10) Patent No.: US 12,111,406 B2
(45) Date of Patent: Oct. 8, 2024

(54) ADAPTIVE DOPPLER-NULLING DIGITIZATION FOR HIGH-RESOLUTION

(71) Applicant: Rockwell Collins, Inc., Cedar Rapids, IA (US)

(72) Inventors: William B. Sorsby, Cedar Rapids, IA (US); Eric J. Loren, North Liberty, IA (US); Tj T. Kwon, Marion, IA (US); James A. Stevens, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 18/199,562

(22) Filed: May 19, 2023

(65) Prior Publication Data
US 2023/0305093 A1    Sep. 28, 2023

Related U.S. Application Data

(60) Continuation of application No. 18/198,671, filed on May 17, 2023, which is a continuation-in-part of (Continued)

(51) Int. Cl.
*H04W 56/00* (2009.01)
*G01S 5/00* (2006.01)
(Continued)

(52) U.S. Cl.
CPC .......... *G01S 5/0027* (2013.01); *G01S 13/583* (2013.01); *G01S 13/62* (2013.01);
(Continued)

(58) Field of Classification Search
CPC ......... H04W 56/0035; H04W 56/0015; H04W 56/005; G01S 5/0027; G01S 13/62
See application file for complete search history.

(56) References Cited

U.S. PATENT DOCUMENTS

| 3,025,519 A | 3/1962 | Brown et al. |
| 4,134,113 A | 1/1979 | Powell |

(Continued)

FOREIGN PATENT DOCUMENTS

| CN | 101330448 A | 12/2008 |
| CN | 101465793 A | 6/2009 |

(Continued)

OTHER PUBLICATIONS

U.S. Appl. No. 17/408,156, filed Aug. 20, 2021, Tj T. Kwon.
(Continued)

*Primary Examiner* — Dominic E Rego
(74) *Attorney, Agent, or Firm* — Suiter Swantz IP

(57) ABSTRACT

A system includes a transmitter node and a receiver node. Each node of the transmitter node and the receiver node are time synchronized to apply Doppler corrections associated with said node's own motions relative to a stationary common inertial reference frame. The stationary common inertial reference frame is known to the transmitter node and the receiver node prior to the transmitter node transmitting a plurality of signals to the receiver node and prior to the receiver node receiving the plurality of signals from the transmitter node. The receiver node performs adaptive digitization of the signals to account for a speed of the platform.

20 Claims, 15 Drawing Sheets

Related U.S. Application Data application No. 18/198,152, filed on May 16, 2023, which is a continuation-in-part of application No. 18/196,807, filed on May 12, 2023, which is a continuation-in-part of application No. 18/134,950, filed on Apr. 14, 2023, which is a division of application No. 17/534,061, filed on Nov. 23, 2021, now Pat. No. 11,665,658, said application No. 18/196,807 is a continuation-in-part of application No. 18/130,285, filed on Apr. 3, 2023, which is a continuation-in-part of application No. 17/990,491, filed on Nov. 18, 2022, which is a continuation-in-part of application No. 17/957,881, filed on Sep. 30, 2022, which is a continuation-in-part of application No. 17/857,920, filed on Jul. 5, 2022, and a continuation-in-part of application No. PCT/US2022/024653, filed on Apr. 13, 2022, which is a continuation of application No. 17/233,107, filed on Apr. 16, 2021, now Pat. No. 11,726,162, said application No. 17/857,920 is a continuation of application No. 17/541,703, filed on Dec. 3, 2021, which is a continuation-in-part of application No. 17/408,156, filed on Aug. 20, 2021, now Pat. No. 11,737,121, and a continuation-in-part of application No. 17/233,107, filed on Apr. 16, 2021, now Pat. No. 11,726,162, and a continuation-in-part of application No. 17/079,175, filed on Oct. 23, 2020, now Pat. No. 11,304,084, and a continuation-in-part of application No. 17/020,231, filed on Sep. 14, 2020, now Pat. No. 11,296,966, which is a continuation-in-part of application No. 16/987,671, filed on Aug. 7, 2020, now Pat. No. 11,290,942, and a continuation-in-part of application No. 16/698,230, filed on Nov. 27, 2019, now Pat. No. 10,999,778, said application No. 17/857,920 is a continuation of application No. 17/534,061, filed on Nov. 23, 2021, now Pat. No. 11,665,658, said application No. 17/957,881 is a continuation-in-part of application No. 17/846,625, filed on Jun. 22, 2022, said application No. 17/990,491 is a continuation-in-part of application No. 17/941,907, filed on Sep. 9, 2022, which is a division of application No. 17/940,898, filed on Sep. 8, 2022, said application No. 18/198,152 is a continuation-in-part of application No. 18/196,912, filed on May 12, 2023, which is a continuation-in-part of application No. 18/134,950, filed on Apr. 14, 2023, and a continuation-in-part of application No. 18/130,285, filed on Apr. 3, 2023, said application No. 18/198,152 is a continuation-in-part of application No. 18/196,931, filed on May 12, 2023, which is a continuation-in-part of application No. 18/134,950, filed on Apr. 14, 2023, and a continuation-in-part of application No. 18/130,285, filed on Apr. 3, 2023, said application No. 18/198,152 is a continuation-in-part of application No. 18/196,765, filed on May 12, 2023, which is a continuation-in-part of application No. 18/134,950, filed on Apr. 14, 2023, which is a continuation-in-part of application No. 18/130,285, filed on Apr. 3, 2023, said application No. 18/198,152 is a continuation-in-part of application No. 18/196,944, filed on May 12, 2023, which is a continuation-in-part of application No. 18/134,950, filed on Apr. 14, 2023, and a continuation-in-part of application No. 18/130,285, filed on Apr. 3, 2023, said application No. 18/198,152 is a continuation-in-part of application No. 18/196,786, filed on May 12, 2023, which is a continuation-in-part of application No. 18/134,950, filed on Apr. 14, 2023, and a continuation-in-part of application No. 18/130,285, filed on Apr. 3, 2023, said application No. 18/198,152 is a continuation-in-part of application No. 18/196,936, filed on May 12, 2023, which is a continuation-in-part of application No. 18/134,950, filed on Apr. 14, 2023, and a continuation-in-part of application No. 18/130,285, filed on Apr. 3, 2023, said application No. 18/198,671 is a continuation-in-part of application No. 18/198,025, filed on May 16, 2023, which is a continuation-in-part of application No. 18/196,807, filed on May 12, 2023, and a continuation-in-part of application No. 18/196,912, filed on May 12, 2023, and a continuation-in-part of application No. 18/196,931, filed on May 12, 2023, and a continuation-in-part of application No. 18/196,765, filed on May 12, 2023, and a continuation-in-part of application No. 18/196,944, filed on May 12, 2023, and a continuation-in-part of application No. 18/196,786, filed on May 12, 2023, and a continuation-in-part of application No. 18/196,936, filed on May 12, 2023.

(60) Provisional application No. 63/344,445, filed on May 20, 2022, provisional application No. 63/400,138, filed on Aug. 23, 2022.

(51) Int. Cl.
*G01S 13/58* (2006.01)
*G01S 13/62* (2006.01)

(52) U.S. Cl.
CPC ... *H04W 56/0015* (2013.01); *H04W 56/0035* (2013.01); *H04W 56/005* (2013.01)

(56) References Cited

U.S. PATENT DOCUMENTS

| | | |
|---|---|---|
| 4,399,531 A | 8/1983 | Grande et al. |
| 4,806,934 A | 2/1989 | Magoon |
| 5,835,482 A | 11/1998 | Allen |
| 5,898,902 A | 4/1999 | Tuzov |
| 6,008,758 A | 12/1999 | Campbell |
| 6,072,425 A | 6/2000 | Vopat |
| 6,115,394 A | 9/2000 | Balachandran et al. |
| 6,195,403 B1 | 2/2001 | Anderson et al. |
| 6,496,940 B1 | 12/2002 | Horst et al. |
| 6,662,229 B2 | 12/2003 | Passman et al. |
| 6,718,174 B2 | 4/2004 | Vayanos |
| 6,721,290 B1 | 4/2004 | Kondylis et al. |
| 6,744,740 B2 | 6/2004 | Chen |
| 6,845,091 B2 | 1/2005 | Ogier et al. |
| 7,023,818 B1 | 4/2006 | Elliott |
| 7,171,476 B2 | 1/2007 | Maeda et al. |
| 7,242,671 B2 | 7/2007 | Li et al. |
| 7,272,472 B1 | 9/2007 | McElreath |
| 7,299,013 B2 | 11/2007 | Rotta et al. |
| 7,343,170 B1 | 3/2008 | Feeney et al. |
| 7,417,948 B2 | 8/2008 | Sjöblom |
| 7,418,343 B1 | 8/2008 | McGraw et al. |
| 7,558,575 B2 | 7/2009 | Losh et al. |
| 7,573,835 B2 | 8/2009 | Sahinoglu et al. |
| 7,633,921 B2 | 12/2009 | Thubert et al. |
| 7,639,652 B1 | 12/2009 | Amis et al. |
| 7,679,551 B2 | 3/2010 | Petovello et al. |
| 7,698,463 B2 | 4/2010 | Ogier et al. |
| 7,719,989 B2 | 5/2010 | Yau |
| 7,729,240 B1 | 6/2010 | Crane et al. |
| 7,787,450 B1 | 8/2010 | Chan et al. |
| 7,881,229 B2 | 2/2011 | Weinstein et al. |
| 7,903,662 B2 | 3/2011 | Cohn |
| 7,983,239 B1 | 7/2011 | Weinstein et al. |

(56) References Cited

U.S. PATENT DOCUMENTS

| | | |
|---|---|---|
| 8,010,287 B1 | 8/2011 | Frank et al. |
| 8,036,224 B2 | 10/2011 | Axelsson et al. |
| 8,159,397 B2 | 4/2012 | Feller et al. |
| 8,159,954 B2 | 4/2012 | Larsson et al. |
| 8,217,836 B1 | 7/2012 | Anderson et al. |
| 8,218,550 B2 | 7/2012 | Axelsson et al. |
| 8,223,660 B2 | 7/2012 | Allan et al. |
| 8,223,868 B2 | 7/2012 | Lee |
| 8,341,289 B2 | 12/2012 | Hellhake et al. |
| 8,369,445 B2 | 2/2013 | Hensley |
| 8,490,175 B2 | 7/2013 | Barton et al. |
| 8,553,560 B2 | 10/2013 | Axelsson et al. |
| 8,599,956 B1 | 12/2013 | Mitchell |
| 8,614,997 B1 | 12/2013 | Herder |
| 8,630,291 B2 | 1/2014 | Shaffer et al. |
| 8,717,230 B1 | 5/2014 | Fischi et al. |
| 8,717,935 B2 | 5/2014 | Lindem, III et al. |
| 8,732,338 B2 | 5/2014 | Hutchison et al. |
| 8,798,034 B2 | 8/2014 | Aggarwal et al. |
| 8,824,444 B1 | 9/2014 | Berenberg et al. |
| 8,867,427 B2 | 10/2014 | Taori et al. |
| 8,880,001 B1 | 11/2014 | Hwang et al. |
| 8,909,471 B1 | 12/2014 | Jinkins et al. |
| 8,913,543 B2 | 12/2014 | Zainaldin |
| 8,942,197 B2 | 1/2015 | Rudnick et al. |
| 8,964,739 B1 | 2/2015 | Wisehart |
| 8,989,326 B2 | 3/2015 | An et al. |
| 9,075,126 B2 | 7/2015 | Robinson |
| 9,179,475 B2 | 11/2015 | Koleszar et al. |
| 9,246,795 B2 | 1/2016 | Madaiah et al. |
| 9,264,126 B2 | 2/2016 | Foster et al. |
| 9,294,159 B2 | 3/2016 | Duerksen |
| 9,304,198 B1 | 4/2016 | Doerry et al. |
| 9,325,513 B2 | 4/2016 | Liu et al. |
| 9,345,029 B2 | 5/2016 | Monte et al. |
| 9,355,564 B1 | 5/2016 | Tyson et al. |
| 9,430,947 B2 | 8/2016 | Richardson et al. |
| 9,435,884 B2 | 9/2016 | Inoue |
| 9,516,513 B2 | 12/2016 | Saegrov et al. |
| 9,523,761 B1 | 12/2016 | Hoffmann et al. |
| 9,544,162 B2 | 1/2017 | Vasseur et al. |
| 9,621,208 B1 | 4/2017 | Snodgrass et al. |
| 9,628,285 B2 | 4/2017 | Császár |
| 9,693,330 B1 | 6/2017 | Snodgrass et al. |
| 9,696,407 B1 | 7/2017 | Greenleaf et al. |
| 9,713,061 B2 | 7/2017 | Ruiz et al. |
| 9,766,339 B2 | 9/2017 | Robinson et al. |
| 9,858,822 B1 | 1/2018 | Gentry |
| 9,883,348 B1 | 1/2018 | Walker et al. |
| 9,979,462 B2 | 5/2018 | Watson et al. |
| 9,979,635 B2 | 5/2018 | Hellhake et al. |
| 10,097,469 B2 | 10/2018 | Hui et al. |
| 10,098,051 B2 | 10/2018 | Mosko et al. |
| 10,205,654 B2 | 2/2019 | Choi et al. |
| 10,257,655 B2 | 4/2019 | Cody |
| 10,365,376 B2 | 7/2019 | Lee et al. |
| 10,382,897 B1 | 8/2019 | Lanes et al. |
| 10,455,521 B2 | 10/2019 | Hudson et al. |
| 10,459,074 B1 | 10/2019 | Omer et al. |
| 10,484,837 B2 | 11/2019 | Navalekar et al. |
| 10,509,130 B2 | 12/2019 | Snyder et al. |
| 10,531,500 B2 | 1/2020 | Ulinskas |
| 10,601,684 B2 | 3/2020 | Hashmi et al. |
| 10,601,713 B1 | 3/2020 | Turgeman et al. |
| 10,609,622 B2 | 3/2020 | Bader et al. |
| 10,620,296 B1 | 4/2020 | Ezal et al. |
| 10,622,713 B2 | 4/2020 | Ma |
| 10,650,688 B2 | 5/2020 | DeRoche |
| 10,719,076 B1 | 7/2020 | Gavrilets et al. |
| 10,785,672 B2 | 9/2020 | Kwan et al. |
| 10,798,053 B2 | 10/2020 | Nolan et al. |
| 10,838,070 B1 | 11/2020 | Chapman et al. |
| 10,871,575 B2 | 12/2020 | Petrovic et al. |
| 10,873,429 B2 | 12/2020 | Kwon et al. |
| 10,908,277 B1 | 2/2021 | Roggendorf et al. |
| 10,931,570 B1 | 2/2021 | Kwon et al. |
| 10,965,584 B1 | 3/2021 | Kwon et al. |
| 10,979,348 B1 | 4/2021 | Kwon et al. |
| 10,993,201 B2 | 4/2021 | Luecke |
| 10,999,778 B1 | 5/2021 | Kwon et al. |
| 11,071,039 B2 | 7/2021 | Fallon et al. |
| 11,073,622 B2 | 7/2021 | Cohen |
| 11,082,324 B2 | 8/2021 | Ramanathan et al. |
| 11,129,078 B2 | 9/2021 | Yates et al. |
| 11,284,295 B1 | 3/2022 | Kwon et al. |
| 11,290,942 B2 | 3/2022 | Kwon et al. |
| 11,411,613 B2 | 8/2022 | Jorgenson et al. |
| 11,415,664 B2 | 8/2022 | Hammes et al. |
| 11,443,638 B2 | 9/2022 | Byxbe |
| 11,500,111 B2 | 11/2022 | Frederiksen et al. |
| 11,528,675 B2 * | 12/2022 | Nagaraja ............... H04L 5/0048 |
| 11,536,850 B2 | 12/2022 | Sharma et al. |
| 2002/0018448 A1 | 2/2002 | Amis et al. |
| 2003/0035589 A1 | 2/2003 | Kim |
| 2003/0151513 A1 | 8/2003 | Herrmann et al. |
| 2004/0012859 A1 | 1/2004 | Minefuji |
| 2004/0028016 A1 | 2/2004 | Billhartz |
| 2004/0123228 A1 | 6/2004 | Kikuchi et al. |
| 2004/0213239 A1 | 10/2004 | Lin et al. |
| 2004/0246902 A1 | 12/2004 | Weinstein et al. |
| 2005/0025076 A1 | 2/2005 | Chaudhuri et al. |
| 2006/0010170 A1 | 1/2006 | Lashley et al. |
| 2006/0056421 A1 | 3/2006 | Zaki |
| 2007/0086541 A1 | 4/2007 | Moon et al. |
| 2007/0097880 A1 | 5/2007 | Rajsic |
| 2007/0109182 A1 | 5/2007 | Budic |
| 2007/0109979 A1 | 5/2007 | Fu et al. |
| 2007/0223497 A1 | 9/2007 | Elson et al. |
| 2007/0299950 A1 | 12/2007 | Kulkarni |
| 2008/0107034 A1 | 5/2008 | Jetcheva et al. |
| 2008/0117904 A1 | 5/2008 | Radha et al. |
| 2008/0219204 A1 | 9/2008 | Lee et al. |
| 2008/0273582 A1 | 11/2008 | Gaal et al. |
| 2008/0291945 A1 | 11/2008 | Luo |
| 2008/0310325 A1 | 12/2008 | Yang |
| 2009/0086713 A1 | 4/2009 | Luo |
| 2009/0271054 A1 | 10/2009 | Dokken |
| 2009/0290572 A1 | 11/2009 | Gonia et al. |
| 2009/0318138 A1 | 12/2009 | Zeng et al. |
| 2010/0074101 A1 | 3/2010 | Skalecki et al. |
| 2010/0074141 A1 | 3/2010 | Nguyen |
| 2011/0006913 A1 | 1/2011 | Chen et al. |
| 2011/0013487 A1 | 1/2011 | Zhou et al. |
| 2011/0188378 A1 | 8/2011 | Collins et al. |
| 2011/0312279 A1 | 12/2011 | Tsai et al. |
| 2012/0092208 A1 | 4/2012 | LeMire et al. |
| 2012/0098699 A1 | 4/2012 | Calmettes et al. |
| 2013/0006834 A1 | 1/2013 | Waelbroeck et al. |
| 2013/0069834 A1 | 3/2013 | Duerksen |
| 2013/0094366 A1 | 4/2013 | Lee et al. |
| 2013/0100942 A1 | 4/2013 | Rudnick et al. |
| 2013/0195017 A1 | 8/2013 | Jamadagni et al. |
| 2013/0250808 A1 | 9/2013 | Hui et al. |
| 2014/0017196 A1 | 1/2014 | Han et al. |
| 2014/0018097 A1 | 1/2014 | Goldstein |
| 2014/0029704 A1 | 1/2014 | Becker |
| 2014/0188990 A1 | 7/2014 | Fulks |
| 2014/0229519 A1 | 8/2014 | Dietrich et al. |
| 2014/0236483 A1 | 8/2014 | Beaurepaire et al. |
| 2014/0258201 A1 | 9/2014 | Finlow-Bates |
| 2014/0292568 A1 | 10/2014 | Fleming et al. |
| 2015/0010153 A1 | 1/2015 | Robertson |
| 2015/0025818 A1 | 1/2015 | Das et al. |
| 2015/0222479 A1 | 8/2015 | Kim et al. |
| 2015/0296335 A1 | 10/2015 | Joshi et al. |
| 2015/0326689 A1 | 11/2015 | Leppänen et al. |
| 2016/0139241 A1 | 5/2016 | Holz et al. |
| 2016/0150465 A1 | 5/2016 | Jung et al. |
| 2016/0187458 A1 * | 6/2016 | Shah ...................... H04W 4/02 455/456.1 |
| 2016/0189381 A1 | 6/2016 | Rhoads |
| 2016/0373997 A1 | 12/2016 | Petersen et al. |
| 2017/0111266 A1 | 4/2017 | Ko |
| 2017/0111771 A1 | 4/2017 | Haque et al. |

(56) References Cited

U.S. PATENT DOCUMENTS

| | | |
|---|---|---|
| 2017/0134227 A1 | 5/2017 | Song et al. |
| 2017/0149658 A1 | 5/2017 | Rimhagen et al. |
| 2018/0013665 A1 | 1/2018 | Ko et al. |
| 2018/0098263 A1 | 4/2018 | Luo et al. |
| 2018/0146489 A1 | 5/2018 | Jin et al. |
| 2018/0234336 A1 | 8/2018 | Schumm et al. |
| 2018/0302807 A1 | 10/2018 | Chen et al. |
| 2018/0317226 A1 | 11/2018 | Sakoda |
| 2019/0098625 A1 | 3/2019 | Johnson et al. |
| 2019/0222302 A1 | 7/2019 | Lin et al. |
| 2019/0251848 A1 | 8/2019 | Sivanesan et al. |
| 2019/0317207 A1 | 10/2019 | Schroder et al. |
| 2019/0349172 A1 | 11/2019 | Zhang |
| 2020/0011968 A1 | 1/2020 | Hammes et al. |
| 2020/0052997 A1 | 2/2020 | Ramanathan et al. |
| 2020/0092949 A1 | 3/2020 | Donepudi et al. |
| 2020/0196309 A1 | 6/2020 | Amouris |
| 2020/0236607 A1 | 7/2020 | Zhu et al. |
| 2020/0292706 A1* | 9/2020 | Hexsel ............ G01S 17/58 |
| 2020/0350983 A1 | 11/2020 | Alasti et al. |
| 2020/0371247 A1 | 11/2020 | Marmet |
| 2020/0396708 A1 | 12/2020 | Bharadwaj et al. |
| 2021/0083917 A1 | 3/2021 | Konishi et al. |
| 2021/0153097 A1 | 5/2021 | Du et al. |
| 2021/0201044 A1 | 7/2021 | Herdade et al. |
| 2021/0302956 A1 | 9/2021 | Sudhakaran et al. |
| 2021/0359752 A1 | 11/2021 | Wang et al. |
| 2021/0385879 A1 | 12/2021 | Mahalingam et al. |
| 2021/0405176 A1 | 12/2021 | Luo |
| 2022/0015101 A1 | 1/2022 | Gallagher et al. |
| 2022/0021702 A1 | 1/2022 | Bouthemy |
| 2022/0030511 A1* | 1/2022 | Wang ............ H04W 40/24 |
| 2022/0038139 A1 | 2/2022 | Löwenmark et al. |
| 2022/0060959 A1* | 2/2022 | Atungsiri ........... H04W 36/32 |
| 2022/0069901 A1 | 3/2022 | Tian et al. |
| 2022/0085892 A1* | 3/2022 | Sorge ............ H04B 10/524 |
| 2022/0086818 A1 | 3/2022 | Nam et al. |
| 2022/0094634 A1 | 3/2022 | Kwon et al. |
| 2022/0143428 A1 | 5/2022 | Goetz et al. |
| 2022/0159741 A1 | 5/2022 | Hoang et al. |
| 2022/0173799 A1 | 6/2022 | Wigard et al. |
| 2022/0198351 A1 | 6/2022 | Beaurepaire et al. |
| 2022/0268916 A1 | 8/2022 | Nagpal |
| 2022/0286254 A1 | 9/2022 | Cha et al. |
| 2022/0317290 A1 | 10/2022 | Kostanic et al. |
| 2022/0334211 A1 | 10/2022 | Loren et al. |
| 2022/0342027 A1 | 10/2022 | Loren et al. |
| 2022/0360320 A1 | 11/2022 | Miao et al. |
| 2022/0365165 A1 | 11/2022 | Kirchner et al. |
| 2022/0368410 A1 | 11/2022 | Ma et al. |
| 2022/0413118 A1 | 12/2022 | Starr et al. |
| 2023/0033690 A1 | 2/2023 | Factor et al. |
| 2023/0057666 A1 | 2/2023 | Kwon et al. |
| 2023/0081728 A1 | 3/2023 | Kwon et al. |
| 2023/0111316 A1 | 4/2023 | Ma et al. |
| 2023/0118153 A1 | 4/2023 | Amorim et al. |
| 2023/0133633 A1 | 5/2023 | Park et al. |
| 2023/0135149 A1 | 5/2023 | Krishnamurthy et al. |
| 2023/0379007 A1* | 11/2023 | Kwon ............ H04W 64/006 |

FOREIGN PATENT DOCUMENTS

| | | |
|---|---|---|
| CN | 101330448 B | 12/2010 |
| CN | 101465793 B | 2/2011 |
| CN | 202257277 U | 5/2012 |
| CN | 101686179 B | 1/2013 |
| CN | 103067286 B | 6/2016 |
| CN | 107645417 A | 1/2018 |
| CN | 110234147 A | 9/2019 |
| CN | 115085799 A | 9/2022 |
| CN | 115688598 A | 2/2023 |
| DE | 102010010935 A1 | 9/2011 |
| EP | 0908022 A2 | 4/1999 |
| EP | 1912392 A2 | 4/2008 |
| EP | 2208084 A4 | 11/2011 |
| EP | 2743726 A1 | 6/2014 |
| EP | 2466964 B1 | 12/2017 |
| EP | 3026961 B1 | 8/2020 |
| GB | 2441610 B | 12/2011 |
| GB | 2542491 A | 3/2017 |
| GB | 2568122 B | 11/2019 |
| GB | 2598610 A | 3/2022 |
| JP | 4290684 B2 | 7/2009 |
| JP | 5164157 B2 | 3/2013 |
| KR | 1020040107702 A | 12/2004 |
| KR | 100568976 B1 | 4/2006 |
| KR | 1020060078814 A | 7/2006 |
| KR | 1020160071964 A | 6/2016 |
| RU | 2718131 C1 | 3/2020 |
| WO | 2008157609 A3 | 3/2009 |
| WO | 2012062091 A1 | 5/2012 |
| WO | 2012165938 A1 | 12/2012 |
| WO | 2015114077 A1 | 8/2015 |
| WO | 2015143604 A1 | 10/2015 |
| WO | 2017101575 A1 | 6/2017 |
| WO | 2018077864 A1 | 5/2018 |
| WO | 2019045767 A1 | 3/2019 |
| WO | 2020117427 A1 | 6/2020 |
| WO | 2020165627 A1 | 8/2020 |
| WO | 2020220233 A1 | 11/2020 |
| WO | 2021251902 A1 | 12/2021 |
| WO | 2022003386 A1 | 1/2022 |
| WO | 2022202858 A1 | 9/2022 |
| WO | 2022221429 A1 | 10/2022 |
| WO | 2022232336 A1 | 11/2022 |
| WO | 2022233042 A1 | 11/2022 |
| WO | 2022233314 A1 | 11/2022 |
| WO | 2023001520 A1 | 1/2023 |
| WO | 2023030622 A1 | 3/2023 |
| WO | 2023031904 A1 | 3/2023 |
| WO | 2023047336 A1 | 3/2023 |
| WO | 2023057655 A1 | 4/2023 |
| WO | 2023067552 A1 | 4/2023 |
| WO | 2023068990 A1 | 4/2023 |
| WO | 2023081918 A1 | 5/2023 |

OTHER PUBLICATIONS

U.S. Appl. No. 17/534,061, filed Nov. 23, 2021, William B. Sorsby.
U.S. Appl. No. 17/857,920, filed Jul. 5, 2022, Eric J. Loren.
U.S. Appl. No. 63/344,445, filed May 20, 2022, Eric J. Loren.
U.S. Appl. No. 16/369,398, filed Mar. 29, 2019, Kwon.
U.S. Appl. No. 16/987,671, filed Aug. 7, 2021, Kwon et al.
U.S. Appl. No. 17/233,107, filed Apr. 16, 2022, Loren et al.
U.S. Appl. No. 17/541,703, filed Dec. 3, 2021, Kwon et al.
U.S. Appl. No. 17/857,920, filed Jul. 5, 2022, Loren et al.
DSSS in a Nutshell, Basics of Design, Research & Design Hub, Sep. 14, 2020.
Extended Search Report for European Application No. 21188737.7 dated Dec. 10, 2021, 8 pages.
Extended Search Report in European Application No. 21190368.7 dated Jan. 5, 2022, 10 pages.
Kwon et al., "Efficient Flooding with Passive Clustering (PC) in Ad Hoc Networks", Computer Communication Review. 32. 44-56. 10.1145/510726.510730, Aug. 11, 2003, 13 pages.
Martorella, M. et al., Ground Moving Target Imaging via SDAP-ISAR Processing: Review and New Trends. Sensors 2021, 21, 2391. https://doi.org/10.3390/s21072391.
Peng Wang, et al., "Convergence of Satellite and Terrestrial Networks: A Comprehensive Survey networks" IEEEAcess; vol. 4, Dec. 31, 2019.
Pulak K. Chowdhury, et al. "Handover Schemes in Satellite Networks: State-of-the-Art and Future Research Directions" 4th Quarter 2006, vol. 8, No. 4, Oct. 1, 2006.
Seddigh et al., "Dominating sets and neighbor elimination-based broadcasting algorithms in wireless networks", IEE Transactions in Parallel and Distributed Systems, IEEE, USA, vol. 13, No. 1, Jan. 1, 2002 (Jan. 1, 2002), pp. 14-25, XP011094090, ISSN: 1045-9219, DOI 10.1109/71.9800214.
Yi et al., "Passive Clustering in Ad Hoc Networks (PC)", URL: https://tools.ietf,org/html/drafts-yi-manet-pc-00, Nov. 14, 2001, 31 pages.

(56) References Cited

OTHER PUBLICATIONS

Turgut D. et al.: "Optimizing clustering algorithm in mobile ad hoc networks using simulated annealing", vol. 3, Mar. 3, 2002, pp. 1492-1497.

* cited by examiner

800

802 signals

804 signals

ADAPTIVE DOPPLER-NULLING DIGITIZATION FOR HIGH-RESOLUTION

CROSS-REFERENCE TO RELATED APPLICATIONS

The present application is related to and claims the benefit of the earliest available effective filing dates under 35 USC § 120 as a continuation in part of the following U.S. patent applications:
- (a) U.S. patent application Ser. No. 17/233,107, filed Apr. 16, 2021, which is incorporated by reference in its entirety;
- (b) P.C.T. Patent Application No. PCT/US22/24653, filed Apr. 13, 2022, which claims priority to U.S. patent application Ser. No. 17/233,107, filed Apr. 16, 2021, all of which are incorporated by reference in its entirety;
- (c) U.S. patent application Ser. No. 17/408,156, filed Aug. 20, 2021, which claims priority to U.S. patent application Ser. No. 17/233,107, filed Apr. 16, 2021, all of which are incorporated by reference in its entirety;
- (d) U.S. patent application Ser. No. 17/541,703, filed Dec. 3, 2021, which is incorporated by reference in its entirety, which claims priority to:
  U.S. patent application Ser. No. 17/408,156, filed Aug. 20, 2021, which is incorporated by reference in its entirety; and
  U.S. patent application Ser. No. 17/233,107, filed Apr. 16, 2021, all of which is incorporated by reference in its entirety;
- (e) U.S. patent application Ser. No. 17/534,061, filed Nov. 23, 2021, which is incorporated by reference in its entirety;
- (f) U.S. Patent Application No. 63/344,445, filed May 20, 2022, which is incorporated by reference in its entirety;
- (g) U.S. patent application Ser. No. 17/857,920, filed Jul. 5, 2022, which is incorporated by reference in its entirety;
- (h) U.S. Patent Application No. 63/400,138, filed Aug. 23, 2022, which is incorporated by reference in its entirety;
- (i) U.S. patent application Ser. No. 17/940,898, filed Sep. 8, 2022, which is incorporated by reference in its entirety;
- (j) U.S. patent application Ser. No. 17/941,907, filed Sep. 9, 2022, which is incorporated by reference in its entirety;
- (k) U.S. patent application Ser. No. 17/957,881, filed Sep. 30, 2022, which is incorporated by reference in its entirety;
- (l) U.S. patent application Ser. No. 17/990,491, filed Nov. 18, 2022, which is incorporated by reference in its entirety;
- (m) U.S. patent application Ser. No. 18/130,285, filed Apr. 3, 2023, which is incorporated by reference in its entirety;
- (n) U.S. patent application Ser. No. 18/134,950, filed Apr. 14, 2023, which is incorporated by reference in its entirety;
- (o) U.S. patent application Ser. No. 18/196,807, filed May 12, 2023, which is incorporated by reference in its entirety;
- (p) U.S. patent application Ser. No. 18/196,912, filed May 12, 2023, which is incorporated by reference in its entirety;
- (q) U.S. patent application Ser. No. 18/196,931, filed May 12, 2023, which is incorporated by reference in its entirety;
- (r) U.S. patent application Ser. No. 18/196,765, filed May 12, 2023, which is incorporated by reference in its entirety;
- (s) U.S. patent application Ser. No. 18/196,944, filed May 12, 2023, which is incorporated by reference in its entirety;
- (t) U.S. patent application Ser. No. 18/196,786, filed May 12, 2023, which is incorporated by reference in its entirety;
- (u) U.S. patent application Ser. No. 18/196,936, filed May 12, 2023, which is incorporated by reference in its entirety;
- (v) U.S. patent application Ser. No. 18/198,025, filed May 16, 2023, which is incorporated by reference in its entirety;
- (w) U.S. patent application Ser. No. 18/198,152, filed May 16, 2023, which is incorporated by reference in its entirety; and
- (x) U.S. patent application Ser. No. 18/198,671, filed May 17, 2023, which is incorporated by reference in its entirety.

TECHNICAL FIELD

The present invention generally relates to position determination, and more specifically to determining relative position between vehicles.

BACKGROUND

Mobile Ad-hoc NETworks (MANET; e.g., "mesh networks") are known in the art as quickly deployable, self-configuring wireless networks with no pre-defined network topology. Each communications node within a MANET is presumed to be able to move freely. Additionally, each communications node within a MANET may be required to forward (relay) data packet traffic. Data packet routing and delivery within a MANET may depend on a number of factors including, but not limited to, the number of communications nodes within the network, communications node proximity and mobility, power requirements, network bandwidth, user traffic requirements, timing requirements, and the like.

MANETs face many challenges due to the limited network awareness inherent in such highly dynamic, low-infrastructure communication systems. Given the broad ranges in variable spaces, the challenges lie in making good decisions based on such limited information. For example, in static networks with fixed topologies, protocols can propagate information throughout the network to determine the network structure, but in dynamic topologies this information quickly becomes stale and must be periodically refreshed. It has been suggested that directional systems are the future of MANETs, but the potential of this future has not as yet been fully realized. In addition to topology factors, fast-moving platforms (e.g., communications nodes moving relative to each other) experience a frequency Doppler shift (e.g., offset) due to the relative radial velocity between each set of nodes. This Doppler frequency shift often limits receive sensitivity levels which can be achieved by a node within a mobile network.

Therefore, it would be advantageous to provide a device, system, and method that cures the shortcomings described above.

SUMMARY

A system is described, in accordance with one or more embodiments of the present disclosure. The system includes a transmitter node and a receiver node. Each node of the transmitter node and the receiver node comprises a communications interface comprising at least one antenna element. Each node of the transmitter node and the receiver node comprises a controller operatively coupled to the communications interface. The controller includes one or more processors. The controller has information of own node velocity and own node orientation. Each node of the transmitter node and the receiver node are time synchronized to apply Doppler corrections associated with said node's own motions relative to a stationary common inertial reference frame. The stationary common inertial reference frame is known to the transmitter node and the receiver node prior to the transmitter node transmitting a plurality of signals to the receiver node and prior to the receiver node receiving the plurality of signals from the transmitter node. The receiver node is configured to digitize the plurality of signals using a step size, determine a modulation amplitude of the plurality of signals, and adjust the step size based on the modulation amplitude.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1:
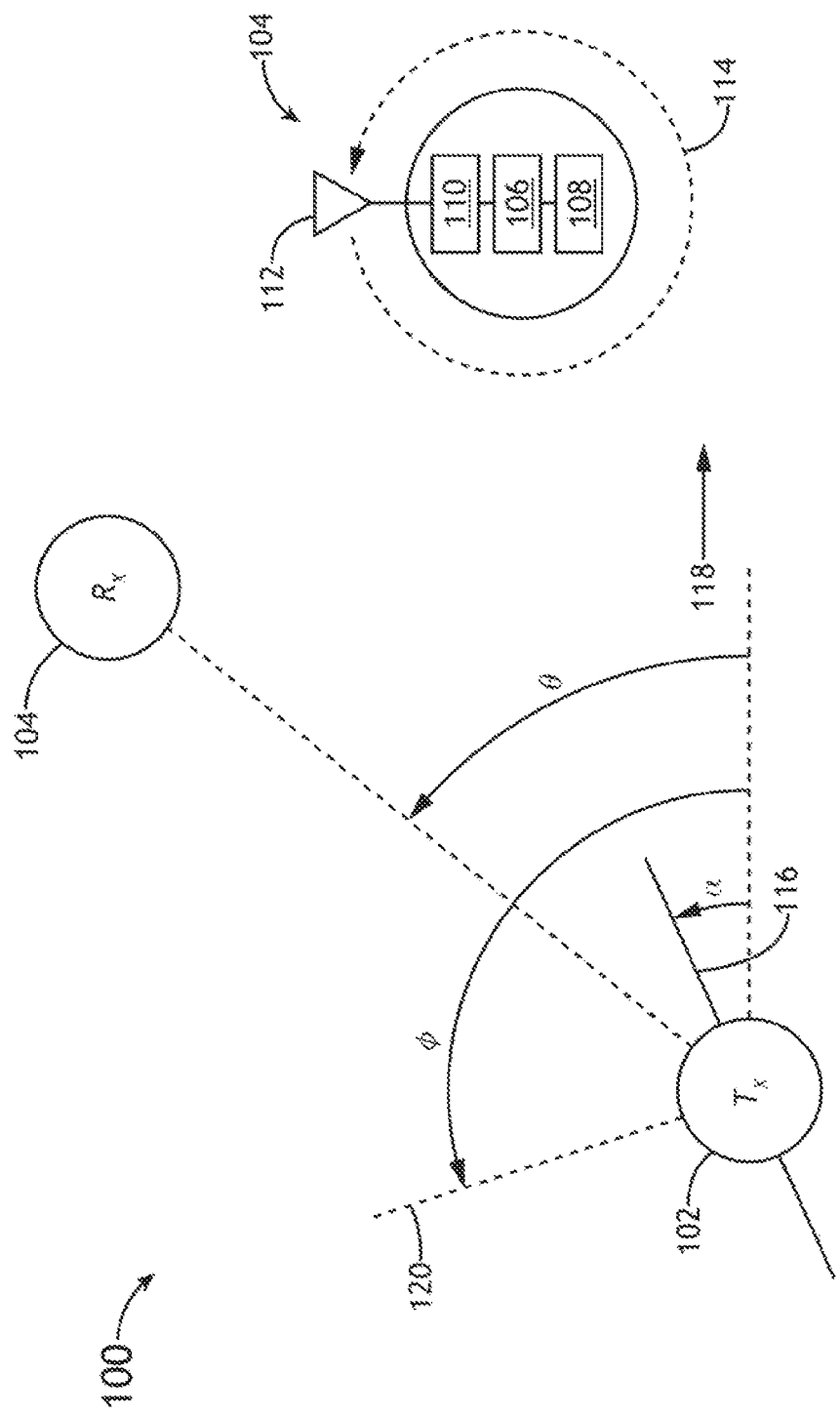
FIG. 1 is a diagrammatic illustration of two nodes in a simplified mobile ad hoc network (MANET) and individual nodes thereof according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Doppler Null Steering (DNS) and Doppler Null Spatial Awareness (DNSA) allows nodes to adjust transmitted and received frequencies to create a Doppler Null in a desired location. The DNS and/or DNSA protocols can be used to find relative bearing between transmitter nodes and receiver nodes where one or both nodes are moving.

Embodiments of the present disclosure are generally directed to adaptive doppler-nulling digitization for high-resolution. Platforms experiencing significantly different Doppler effects can be accommodated by a common receiving node. A DNSA transmitter introduces modulation amounts only according to its own platform Doppler effects. A corresponding receiver, however, may need to accommodate both relatively fast-moving platforms and relatively slow-moving platforms while simultaneously providing fast discovery, good sensitivity, and high accuracy for each platform type.

Adjustments are made to various Doppler needs using adaptive digitization. A high-resolution analog-to-digital process can be employed for slow-moving platforms, while an analog-to-digital process having much larger quantization steps can be used for fast moving platforms. The adaptive digitization provides the ability to use a single Doppler-nulling receiving system for a wide range of potential platforms—from relatively slow-moving vehicles such as automobiles, to very fast-moving vehicles such as Low-Earth-Orbit (LEO) satellites.

As described in U.S. patent application Ser. No. 18/130, 285, filed Apr. 3, 2023, which is herein incorporated by reference in its entirety, embodiments may utilize time synchronized scanning sequences (along with directionality) to improve metrics such as signal-to-noise ratio, signal acquisition time, speed of attaining situational awareness of attributes of surrounding nodes, range, and the like. In some embodiments, a zero value or near zero value (e.g., or the like such as a zero crossing) of a calculated net frequency shift of a received signal is used to determine a bearing angle between the source (e.g., Tx node) and the receiving node using a time-of-arrival of the received signal. The bearing angle may be made more accurate by combining (e.g., averaging) it with another bearing angle estimation determined from an angle of peak amplitude gain of the signal.

It is noted that U.S. patent application Ser. No. 17/857, 920, filed Jul. 5, 2022, is at least partially reproduced by at least some (or all) of the illustrations of FIGS. 1-7 and at least some (or all) of the corresponding language for FIGS. 1-7 below. For example, at least some examples of doppler nulling methods and systems may be better understood, in a nonlimiting manner, by reference to FIGS. 1-7. Such embodiments and examples are provided for illustrative purposes and are not to be construed as necessarily limiting. For instance, in embodiments the transmitter node may be stationary rather than moving and/or vice versa.

Moreover, and stated for purposes of navigating the disclosure only and not to be construed as limiting, descriptions that may relate to other language not necessarily reproduced from U.S. patent application Ser. No. 17/857, 920 include the discussion and figures after FIGS. 1-7.

Referring now to FIGS. 1-7, in some embodiments, a stationary receiver may determine a cooperative transmitter's direction and velocity vector by using a Doppler null scanning approach in two dimensions. A benefit of the approach is the spatial awareness without exchanging explicit positional information. Other benefits include discovery, synchronization, and Doppler corrections which are important for communications. Some embodiment may combine coordinated transmitter frequency shifts along with the transmitter's motion induced Doppler frequency shift to produce unique net frequency shift signal characteristics resolvable using a stationary receiver to achieve spatial awareness. Further, some embodiment may include a three-dimensional (3D) approach with the receiver and the transmitter in motion.

Some embodiments may use analysis performed in a common reference frame (e.g., a common inertial reference frame, such as the Earth, which may ignore the curvature of Earth), and it is assumed that the communications system for each of the transmitter and receiver is informed by the platform of its own velocity and orientation. The approach described herein can be used for discovery and tracking, but the discussion here focuses on discovery which is often the most challenging aspect.

The meaning of the Doppler Null' can be explained in part through a review of the two-dimensional (2D) case without the receiver motion, and then may be expounded on by a review of adding the receiver motion to the 2D case, and then including receiver motion in the 3D case.

The Doppler frequency shift of a communications signal is proportional to the radial velocity between transmitter and receiver, and any significant Doppler shift is typically a hindrance that should be considered by system designers. In contrast, some embodiments utilize the Doppler effect to discriminate between directions with the resolution dictated by selected design parameters. Furthermore, such embodiments use the profile of the net frequency shift as the predetermined 'Null' direction scans through the angle space. The resultant profile is sinusoidal with an amplitude that provides the transmitter's speed, a zero net frequency shift when the 'Null' direction aligns with the receiver, and a minimum indicating the direction of the transmitter's velocity. It should be noted that that the transmitter cannot correct for Doppler in all directions at one time so signal characteristics are different in each direction and are different for different transmitter velocities as well. It is exactly these characteristics that the receiver uses to determine spatial awareness. The received signal has temporal spatial characteristics that can be mapped to the transmitter's direction and velocity. This approach utilizes the concept of a 'Null' which is simply the direction where the transmitter perfectly corrects for its own Doppler shift. The same 'Nulling' protocol runs on each node and scans through all directions, such as via a scanning sequence of a protocol. Here we arbitrarily illustrate the scanning with discrete successive steps of 10 degrees but in a real system; however, it should be understood that any suitable step size of degrees may be used for Doppler null scanning.

As already mentioned, one of the contributions of some embodiments is passive spatial awareness. Traditionally, spatial information for neighbor nodes (based on a global positioning system (GPS) and/or gyros and accelerometers) can be learned via data communication. Unfortunately, spatial awareness via data communication, referred to as active spatial awareness is possible only after communication has already been established, not while discovering those neighbor nodes. Data communication is only possible after the signals for neighbor nodes have been discovered, synchronized and Doppler corrected. In contrast, in some embodiments, the passive spatial awareness described herein may be performed using only synchronization bits associated with acquisition. This process can be viewed as physical layer overhead and typically requires much lower bandwidth compared to explicit data transfers. The physical layer overheads for discovery, synchronization and Doppler correction have never been utilized for topology learning for upper layers previously.

Traditionally, network topology is harvested via a series of data packet exchanges (e.g., hello messaging and link status advertisements). The passive spatial awareness may eliminate hello messaging completely and provide a wider local topology which is beyond the coverage of hello messaging. By utilizing passive spatial awareness, highly efficient mobile ad hoc networking (MANET) is possible. Embodiments may improve the functioning of a network, itself.

Referring to FIG. 1, a multi-node communications network 100 is disclosed. The multi-node communications network 100 may include multiple communications nodes, e.g., a transmitter (Tx) node 102 and a receiver (Rx) node 104.

In embodiments, the multi-node communications network 100 may include any multi-node communications network known in the art. For example, the multi-node communications network 100 may include a mobile ad-hoc network (MANET) in which the Tx and Rx nodes 102, 104 (as well as every other communications node within the multi-node communications network) is able to move freely and independently. Similarly, the Tx and Rx nodes 102, 104 may include any communications node known in the art which may be communicatively coupled. In this regard, the Tx and Rx nodes 102, 104 may include any communications node known in the art for transmitting/transceiving data packets. For example, the Tx and Rx nodes 102, 104 may include, but are not limited to, radios (such as on a vehicle or on a person), mobile phones, smart phones, tablets, smart watches, laptops, and the like. In embodiments, the Rx node 104 of the multi-node communications network 100 may each include, but are not limited to, a respective controller 106 (e.g., control processor), memory 108, communication interface 110, and antenna elements 112. (In embodiments, all attributes, capabilities, etc. of the Rx node 104 described below may similarly apply to the Tx node 102, and to any other communication node of the multi-node communication network 100.)

In embodiments, the controller 106 provides processing functionality for at least the Rx node 104 and can include any number of processors, micro-controllers, circuitry, field programmable gate array (FPGA) or other processing systems, and resident or external memory for storing data, executable code, and other information accessed or generated by the Rx node 104. The controller 106 can execute one or more software programs embodied in a non-transitory computer readable medium (e.g., memory 108) that implement techniques described herein. The controller 106 is not limited by the materials from which it is formed or the processing mechanisms employed therein and, as such, can be implemented via semiconductor(s) and/or transistors (e.g., using electronic integrated circuit (IC) components), and so forth.

In embodiments, the memory 108 can be an example of tangible, computer-readable storage medium that provides storage functionality to store various data and/or program code associated with operation of the Rx node 104 and/or controller 106, such as software programs and/or code segments, or other data to instruct the controller 106, and possibly other components of the Rx node 104, to perform the functionality described herein. Thus, the memory 108 can store data, such as a program of instructions for operating the Rx node 104, including its components (e.g., controller 106, communication interface 110, antenna elements 112, etc.), and so forth. It should be noted that while a single memory 108 is described, a wide variety of types and combinations of memory (e.g., tangible, non-transitory memory) can be employed. The memory 108 can be integral with the controller 106, can comprise stand-alone memory, or can be a combination of both. Some examples of the memory 108 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

In embodiments, the communication interface 110 can be operatively configured to communicate with components of the Rx node 104. For example, the communication interface 110 can be configured to retrieve data from the controller 106 or other devices (e.g., the Tx node 102 and/or other nodes), transmit data for storage in the memory 108, retrieve data from storage in the memory, and so forth. The communication interface 110 can also be communicatively coupled with the controller 106 to facilitate data transfer between components of the Rx node 104 and the controller 106. It should be noted that while the communication interface 110 is described as a component of the Rx node 104, one or more components of the communication interface 110 can be implemented as external components communicatively coupled to the Rx node 104 via a wired and/or wireless connection. The Rx node 104 can also include and/or connect to one or more input/output (I/O) devices. In embodiments, the communication interface 110 includes or is coupled to a transmitter, receiver, transceiver, physical connection interface, or any combination thereof.

It is contemplated herein that the communication interface 110 of the Rx node 104 may be configured to communicatively couple to additional communication interfaces 110 of additional communications nodes (e.g., the Tx node 102) of the multi-node communications network 100 using any wireless communication techniques known in the art including, but not limited to, GSM, GPRS, CDMA, EV-DO, EDGE, WiMAX, 3G, 4G, 4G LTE, 5G, Wi-Fi protocols, RF, LoRa, and the like.

In embodiments, the antenna elements 112 may include directional or omnidirectional antenna elements capable of being steered or otherwise directed (e.g., via the communications interface 110) for spatial scanning in a full 360-degree arc (114) relative to the Rx node 104 (or even less than a full 360-degree arc).

In embodiments, the Tx node 102 and Rx node 104 may one or both be moving in an arbitrary direction at an arbitrary speed, and may similarly be moving relative to each other. For example, the Tx node 102 may be moving relative to the Rx node 104 according to a velocity vector 116 ($|\vec{V_T}|$), at a relative velocity VT and a relative angular direction (an angle α relative to an arbitrary direction 118 (e.g., due east); θ may be the angular direction of the Rx node relative to due east.

In embodiments, the Tx node 102 may implement a Doppler nulling protocol. For example, the Tx node 102 may adjust its transmit frequency to counter the Doppler frequency offset such that there is no net frequency offset (e.g., "Doppler null") in a Doppler nulling direction 120 (e.g., at an angle φ relative to the arbitrary direction 118). The transmitting waveform (e.g., the communications interface 110 of the Tx node 102) may be informed by the platform (e.g., the controller 106) of its velocity vector and orientation (e.g., α, $|\vec{V_T}|$) and may adjust its transmitting frequency to remove the Doppler frequency shift at each Doppler nulling direction 120 and angle φ.

To illustrate aspects of some embodiments, we show the 2D dependence of the net frequency shift for a stationary receiver as a function of Null direction across the horizon, as shown in a top-down view of FIG. 1, where the receiver node 104 is stationary and positioned θ from east relative to the transmitter, the transmitter node 102 is moving with a speed $|\vec{V_T}|$ and direction α from east and a snapshot of the scanning φ which is the 'Null' direction, exemplarily shown as 100 degrees in this picture.

The Doppler shift is a physical phenomenon due to motion and can be considered as a channel effect. In this example the transmitter node 102 is the only moving object, so it is the only source of Doppler shift. The Doppler frequency shift as seen by the receiver node 104 due to the transmitter node 102 motion is:

$$\frac{\Delta f_{DOPPLER}}{f} = \frac{|\vec{V_T}|}{c} \cos(\theta - \alpha),$$

where c is the speed of light.

The other factor is the transmitter frequency adjustment term that should exactly compensate the Doppler shift when the 'Null' direction aligns with the receiver direction. It is the job of the transmitter node 102 to adjust its transmit frequency according to its own speed ($|\vec{V_T}|$), and velocity direction α. That transmitter frequency adjustment ($\Delta f_T$) is proportional to the velocity projection onto the 'Null' direction φ (120) and is:

$$\frac{\Delta f_T}{f} = -\frac{|\vec{V_T}|}{c} \cos(\varphi - \alpha).$$

The net frequency shift seen by the receiver is the sum of the two terms:

$$\frac{\Delta f_{net}}{f} = \frac{|\vec{V_T}|}{c} [\cos(\theta - \alpha) - \cos(\varphi - \alpha)].$$

It is assumed that the velocity vector and the direction changes slowly compared to the periodic measurement of $\Delta f_{net}$. Under those conditions, the unknown parameters (from the perspective of the receiver node 104) of α, $|\vec{V_T}|$, and θ are constants.

Furthermore, it is assumed that the receiver node 104 has an implementation that resolves the frequency of the incoming signal, as would be understood to one of ordinary skill in the art.

Figure 2A:
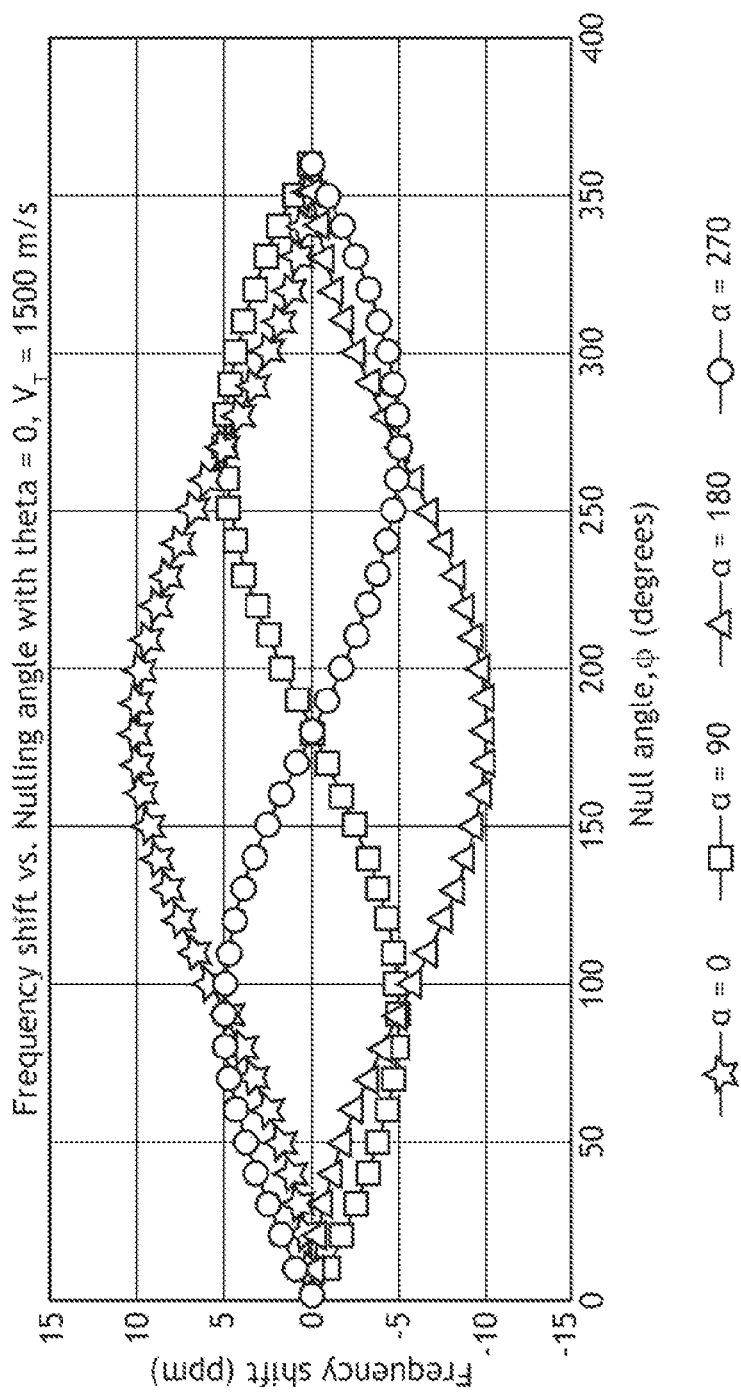
FIG. 2A is a graphical representation of frequency shift profiles within the MANET of FIG. 1.
Figure 2B:
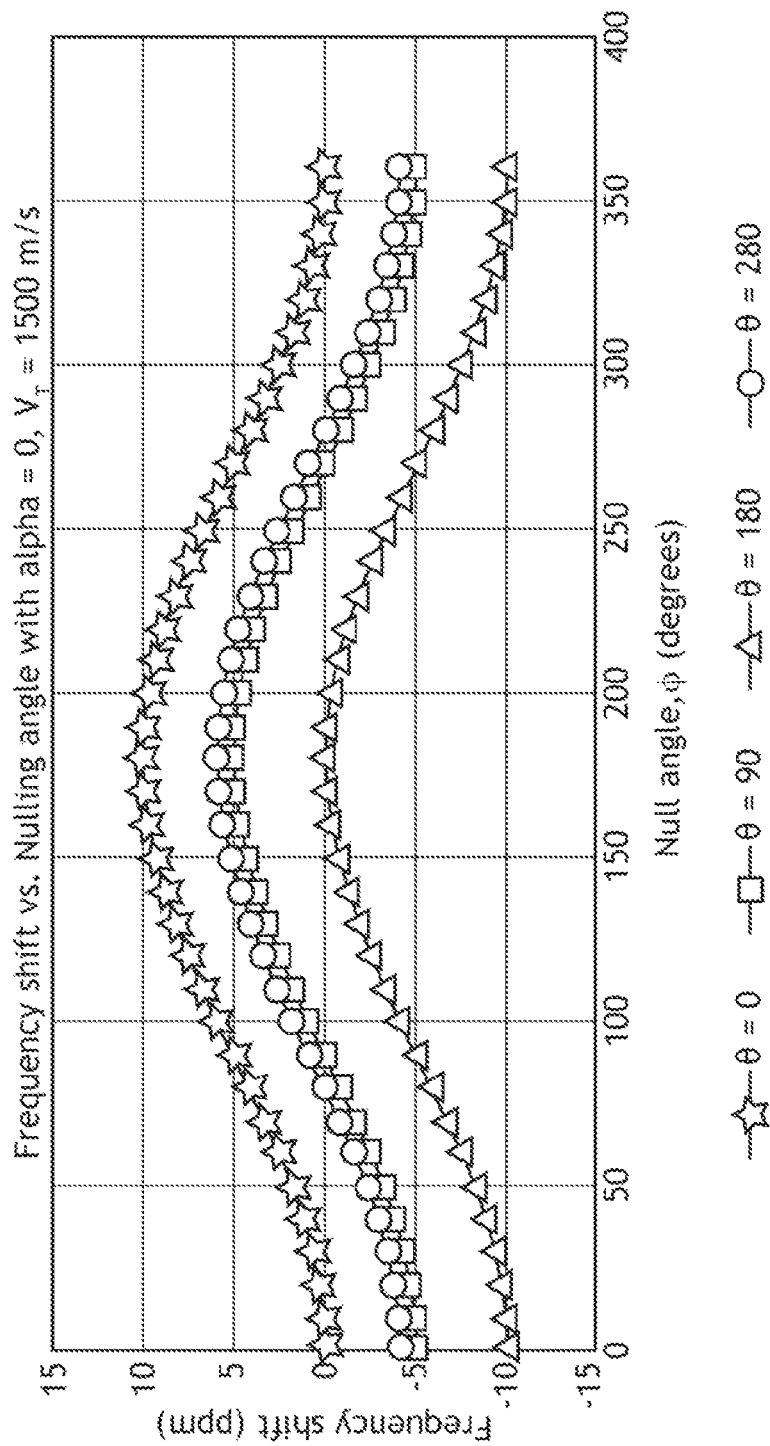
FIG. 2B is a graphical representation of frequency shift profiles within the MANET of FIG. 1.

FIG. 2A shows the resulting net frequency shift as a function of the 'Null' direction φ (120) for scenarios where a stationary receiver is due east of the transmitter (θ=0), and assuming a transmitter speed $|\vec{V_T}|$ of 1500 meters per second (m/s). FIG. 2B shows the results for a stationary receiver and for several directions with a due-east transmitter node velocity direction (α=0). The frequency shifts are in units of parts per million (ppm). As shown in FIGS. 2A and 2B, the amplitude is consistent with the transmitter node's 102 speed of 5 ppm [$|\vec{V_T}|/c*(1\times 106)$] regardless of the velocity direction or position, the net frequency shift is zero when the 'Null' angle is in the receiver direction (when φ=8), and the minimum occurs when the 'Null' is aligned with the transmitter node's 102 velocity direction (when φ=α).

From the profile, the receiver node 104 can therefore determine the transmitter node's 102 speed, the transmitter node's 102 heading, and the direction of the transmitter node 102 is known to at most, one of two locations (since some profiles have two zero crossings). It should be noted that the two curves cross the y axis twice (0 & 180 degrees in FIG. 2A, and ±90 degrees in FIG. 2B) so there is initially an instance of ambiguity in position direction. In this case the receiver node 104 knows the transmitter node 102 is either East or West of the receiver node 104.

Figure 3:
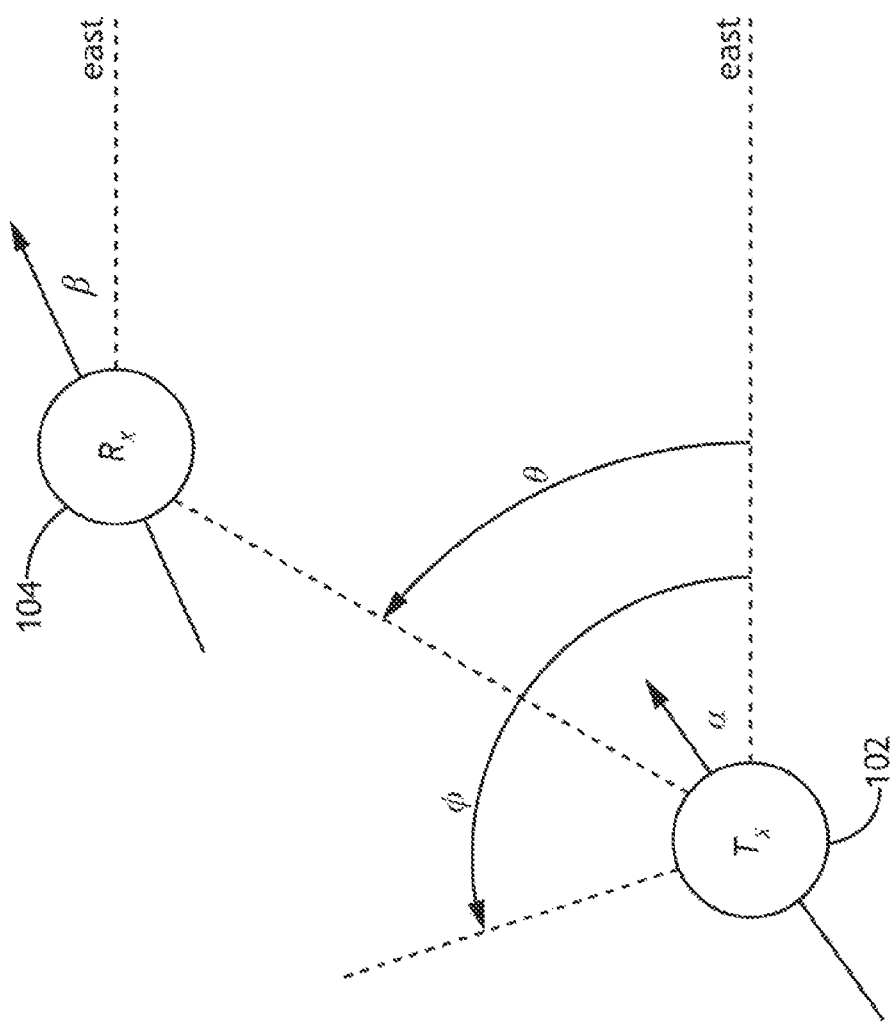
FIG. 3 is a diagrammatic illustration of a transmitter node and a receiver node according to example embodiments of this disclosure.

Referring to FIG. 3, a multi-node communications network 100 is disclosed. The multi-node communications network 100 may include multiple communications nodes, e.g., a transmitter (Tx) node 102 and a receiver (Rx) node 104. As shown in FIG. 3 both of the transmitter node 102 and the receiver node 104 are in motion in two dimensions.

The simultaneous movement scenario is depicted in FIG. 3 where the receiver node 104 is also moving in a generic velocity characterized by a speed $|\vec{V_R}|$ and the direction β relative to due east. The protocol for the moving receiver node 104 incorporates a frequency adjustment on the receiver node's 104 side to compensate for the receiver node's motion as well. The equations have two additional terms. One is a Doppler term for the motion of the receiver, and the second is frequency compensation by the receiver.

Again, the Doppler shift is a physical phenomenon due to motion and can be considered as a channel effect, but in this case both the transmitter node 102 and the receiver node 104 are moving, so there are two Doppler shift terms. The true Doppler shift as seen by the receiver due to the relative radial velocity is:

$$\frac{\Delta f_{DOPPLER}}{f} = \frac{|\vec{V_T}|}{c} \cos(\theta - \alpha) - \frac{|\vec{V_R}|}{c} \cos(\theta - \beta).$$

The other factors are the transmitter node 102 and receiver node 104 frequency adjustment terms that exactly compensate the Doppler shift when the 'Null' direction aligns with the receiver direction (e.g., when φ=β). It is the job of the transmitter node 102 to adjust the transmitter node's 102 transmit frequency according to its own speed ($|\vec{V_T}|$), and velocity direction α. That transmitter node frequency adjustment is proportional to the velocity projection onto the 'Null' direction φ and is the first term in the equation below.

It is the job of the receiver node 104 to adjust the receiver node frequency according to the receiver node's 104 own speed ($|\vec{V_R}|$), and velocity direction β. That receiver node frequency adjustment is proportional to the velocity projection onto the 'Null' direction φ and is the second term in the equation below. The receiver node frequency adjustment can be done to the receive signal prior to the frequency resolving algorithm or could be done within the algorithm.

$$\frac{\Delta f_{T\&R}}{f} = -\frac{|\vec{V_T}|}{c} \cos(\varphi - \alpha) + \frac{|\vec{V_R}|}{c} \cos(\varphi - \beta).$$

The net frequency shift seen by the receiver is the sum of all terms:

$$\frac{\Delta f_{net}}{f} = \frac{|\vec{V_T}|}{c} [\cos(\theta - \alpha) - \cos(\varphi - \alpha)] - \frac{|\vec{V_R}|}{c} [\cos(\theta - \beta) - \cos(\varphi - \beta)].$$

Again, it is assumed that the receiver node 104 has an implementation that resolves the frequency of the incoming signal, as would be understood in the art.

Also, it is assumed that the velocity vector and direction changes slowly compared to the periodic measurement of $\Delta f_{net}$. Again, under such conditions, the unknown parameters (from the perspective of the receiver node 104) $\alpha$, $|\vec{V_T}|$, and $\theta$ are constants. When the velocity vector or direction changes faster, this change could be tracked, for example if the change is due to slow changes in acceleration.

Figure 4A:
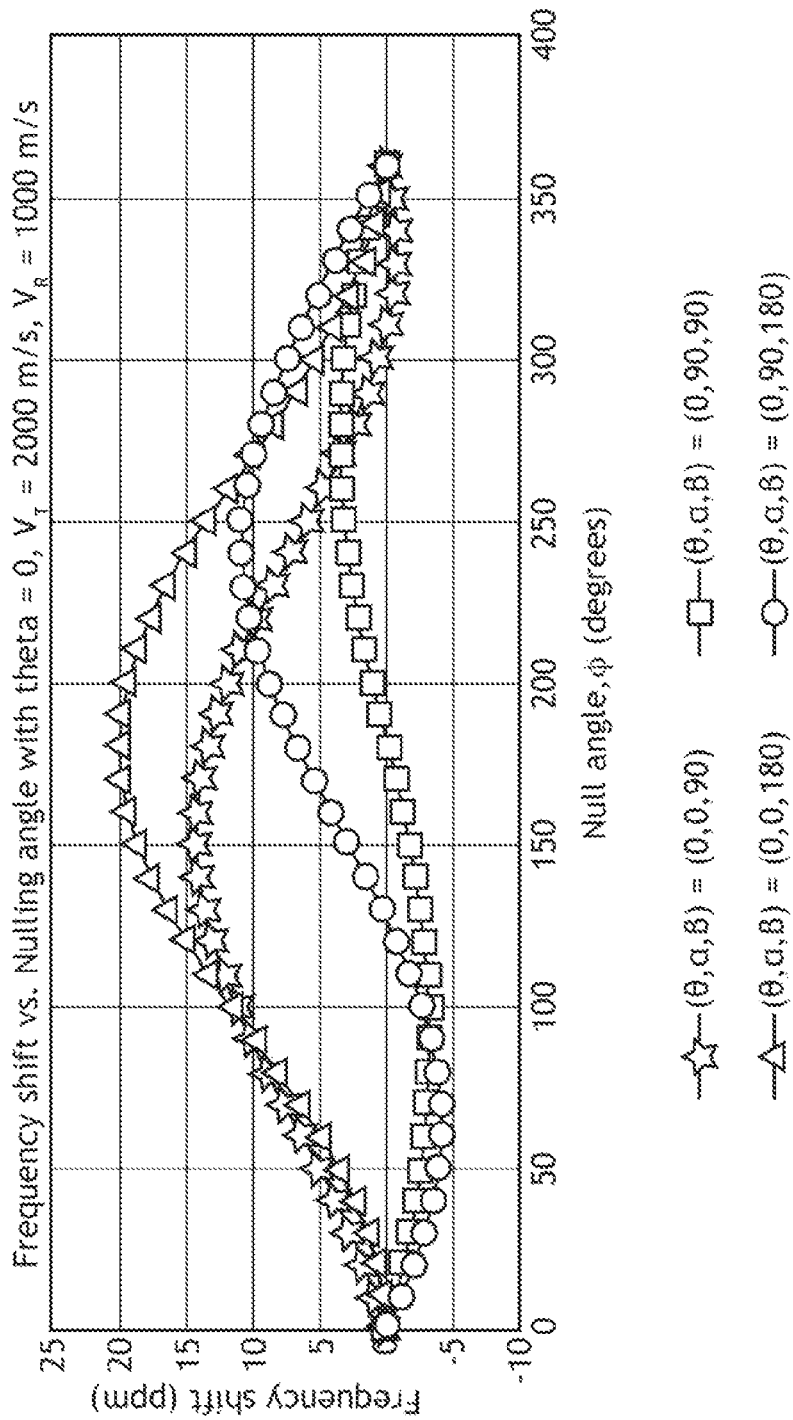
FIG. 4A is a graphical representation of frequency shift profiles within the MANET of FIG. 3.
Figure 4B:
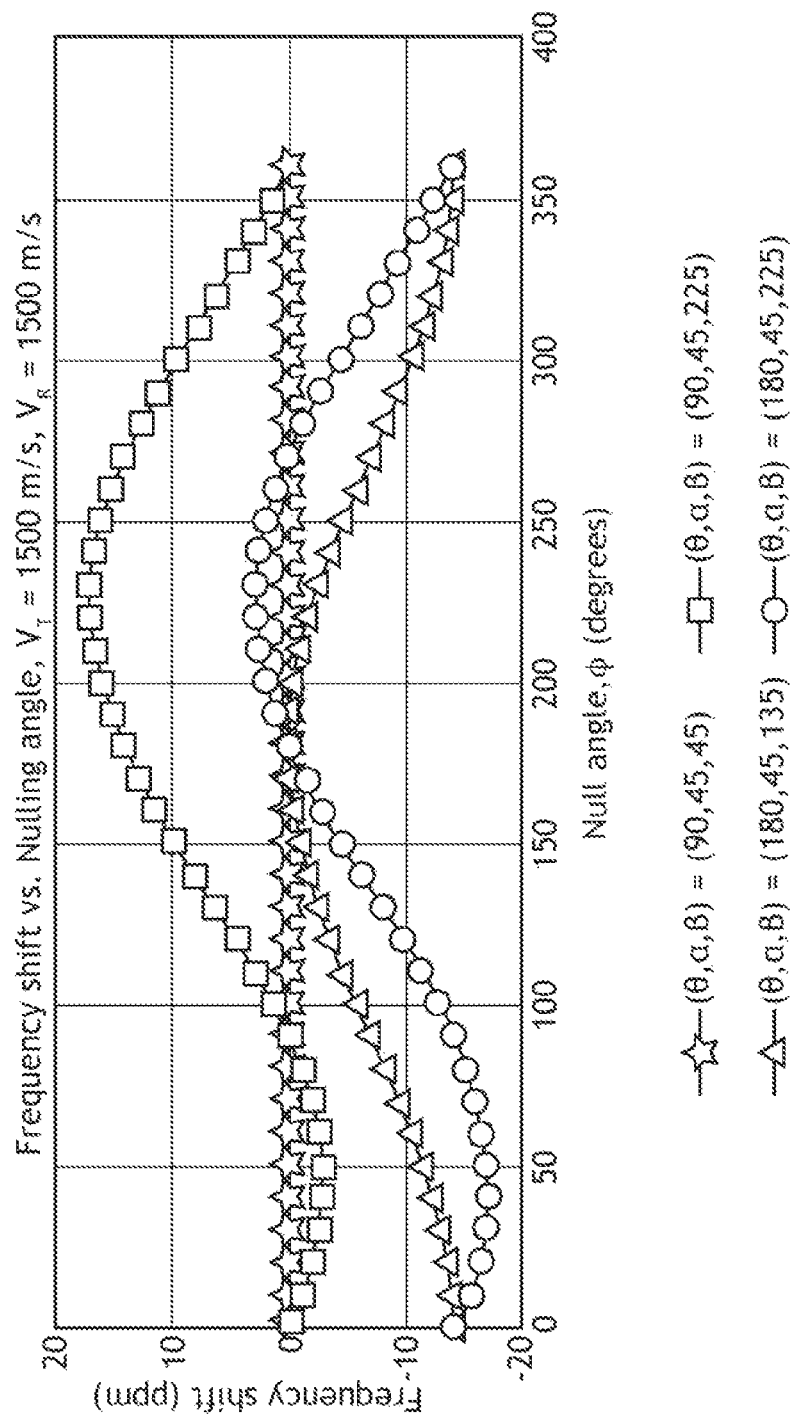
FIG. 4B is a graphical representation of frequency shift profiles within the MANET of FIG. 3.

Referring now to FIGS. 4A-4B.

The net frequency shift for the two-dimensional (2D) moving receiver node 104 approach is shown in FIGS. 4A and 4B for several scenario cases of receiver node location $\theta$, transmitter node and receiver node speeds ($|\vec{V_T}|$ & $|\vec{V_R}|$), and transmitter node and receiver node velocity directions $\alpha$ and $\beta$ respectively. FIG. 4A shows different speeds for the transmitter node 102 and receiver node 104 as well as the receiver node location of $\theta=0$. FIG. 4B assumes the same speed (e.g., 1500 m/s) for the transmitter node and receiver node. Similarly, there are three concepts to notice here:

First, the amplitude is consistent with the relative velocity between transmitter node 102 and receiver node 104.

$$\frac{\left|\left(|\vec{V_T}|\cos\alpha - |\vec{V_R}|\cos\beta\right)\right|}{c * 1e^6}.$$

Second, the net frequency shift is zero when the 'Null' angle is in the receiver direction, e.g., when $\varphi=\theta$.

Third, the minimum occurs when the 'Null' angle is aligned with the relative velocity direction, e.g., when $\varphi=\text{angle}(|\vec{V_T}|\cos\alpha - |\vec{V_R}|\cos\beta)$.

Again, there is an initial dual point ambiguity with the position $\theta$, but the transmitter node's 102 speed and velocity vector are known.

Figure 5:
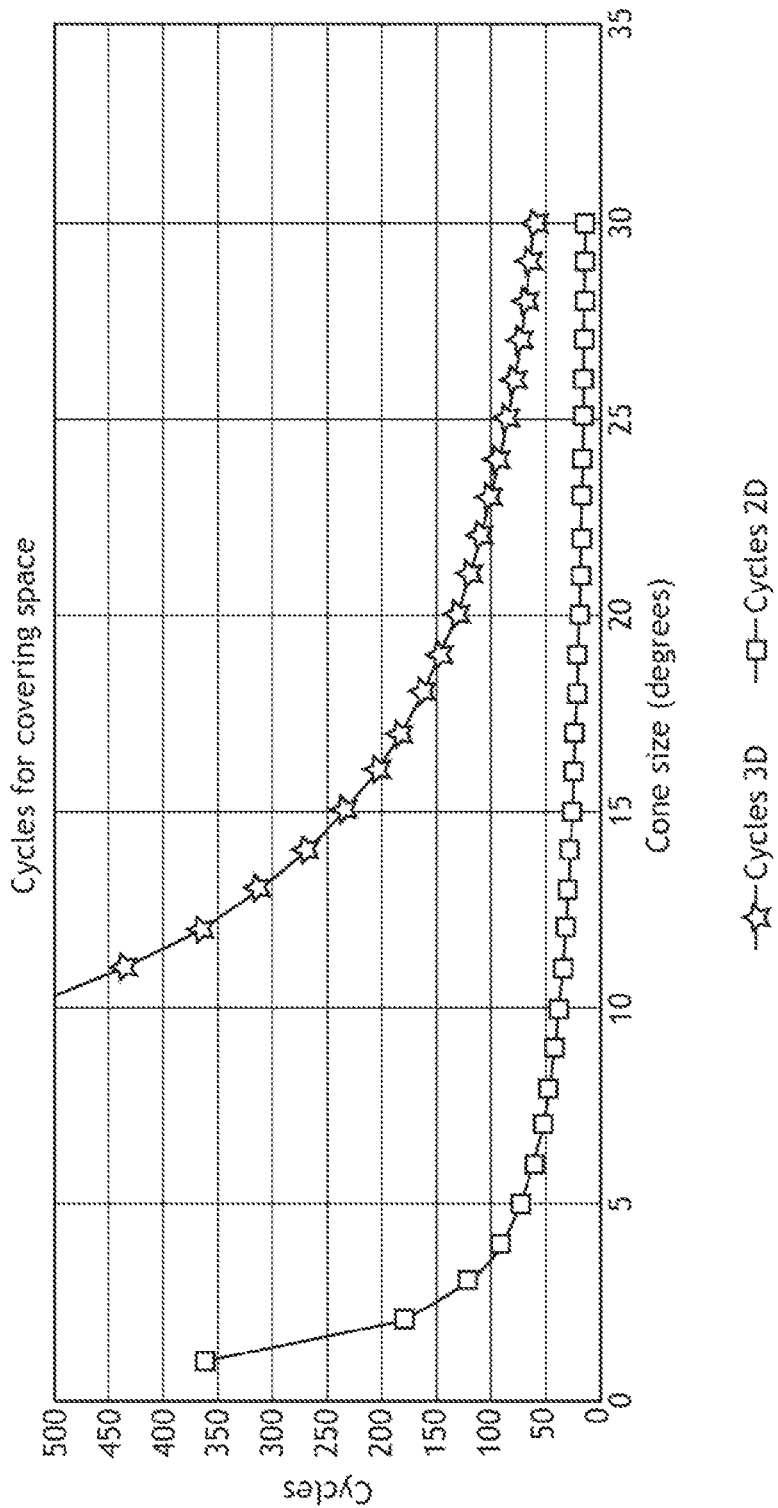
FIG. 5 is a graph of sets for covering space.

Referring now to FIG. 5, while the 2D picture is easier to visualize, the same principles apply to the 3D case. FIG. 5 shows a number of direction sets needed to span 3D and 2D space with different cone sizes (cone sizes are full width). Before diving into the equations, it's worth commenting on the size of the space when including another dimension. For example, when a 'Null' step size of 10 degrees was used in the previous examples, it took 36 sets to span the 360 degrees in 2D. Thus, if an exemplary detection angle of 10 degrees is used (e.g., a directional antenna with 10-degree cone) it would take 36 sets to cover the 2D space. The 3D fractional coverage can be computed by calculating the coverage of a cone compared to the full $4\pi$ pi steradians. The fraction is equal to the integral $$\text{Fraction Coverage } 3D = \int_0^{\frac{\text{Cone Size}}{2}} \frac{r^2 \sin(\theta')d\theta'd\varphi}{4\pi r^2} = \frac{1-\cos\left(\frac{\text{Cone Size}}{2}\right)}{2}$$

$$\text{Fraction Coverage } 2D = \frac{2\pi}{\text{Cone Size}}$$

The number of sets to span the space is shown in FIG. 5 for both the 2D and 3D cases, which correlates with discovery time. Except for narrow cone sizes, the number of sets is not drastically greater for the 3D case (e.g., approximately 15 times at 10 degrees, 7 time at 20 degrees, and around 5 times at 30 degrees). Unless systems are limited to very narrow cone sizes, the discovery time for 3D searches is not overwhelming compared to a 2D search.

Figure 6:
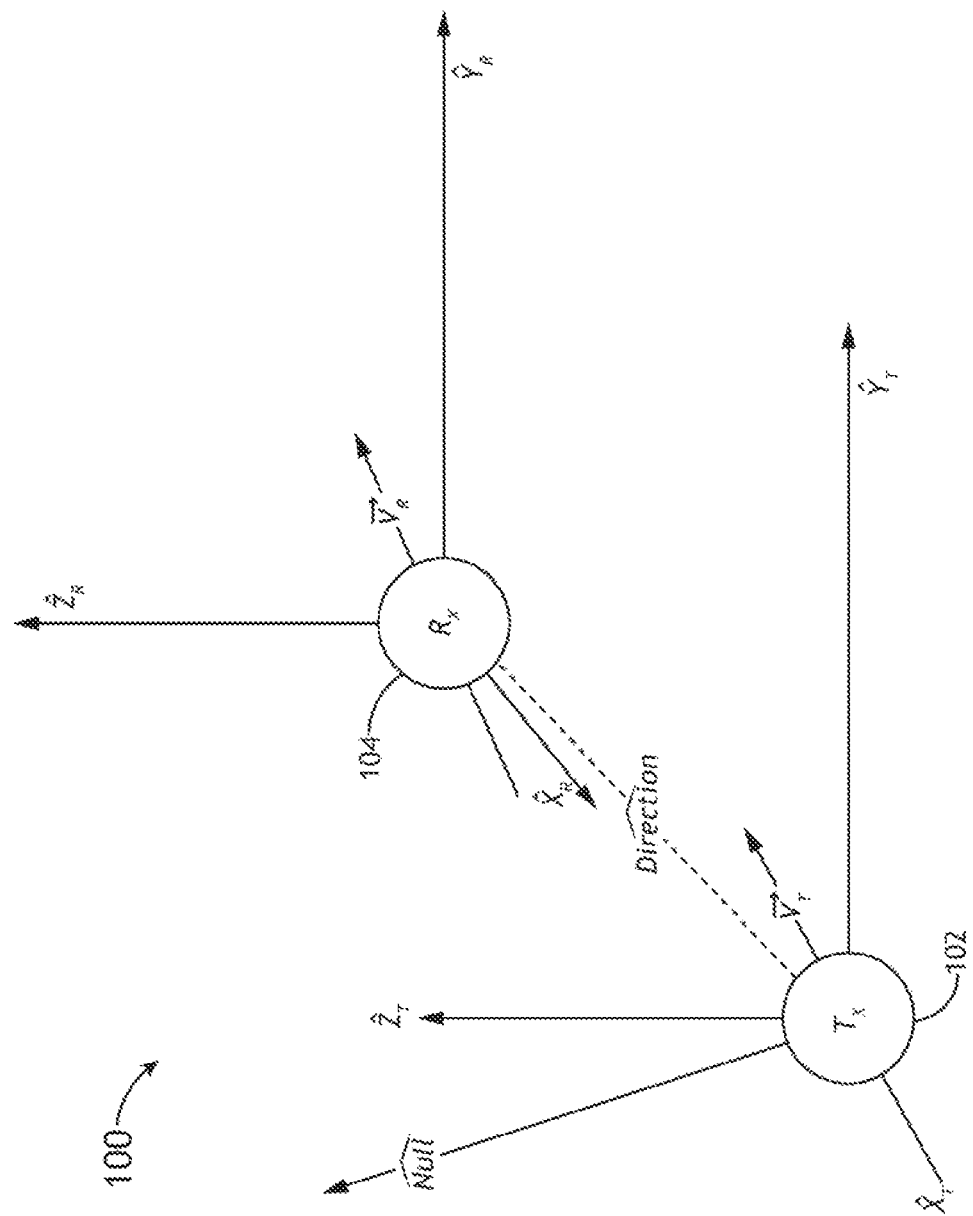
FIG. 6 is a diagrammatic illustration of a transmitter node and a receiver node according to example embodiments of this disclosure.

Referring now to FIG. 6, a multi-node communications network 100 is disclosed. The multi-node communications network 100 may include multiple communications nodes, e.g., a transmitter (Tx) node 102 and a receiver (Rx) node 104. As shown in FIG. 6 both the transmitter node 102 and the receiver node 104 are in motion in three dimensions.

The 3D approach to Doppler nulling follows the 2D approach but it is illustrated here with angles and computed vectorially for simplicity.

In three dimensions, it is convenient to express the equations in vector form which is valid for 2 or 3 dimensions. FIG. 6 shows the geometry in 3 dimensions where $\widehat{Direction}$ is the unit vector pointing to the receiver from the transmitter, and $\widehat{Null}$ is the unit vector pointing in the 'Null' direction defined by the protocol.

The true Doppler shift as seen by the receiver node 104 due to the relative radial velocity which is the projection onto the $\widehat{Direction}$ vector:

$$\frac{\Delta f_{DOPPLER}}{f} = \frac{1}{c}\vec{V_T}\cdot\widehat{Direction} - \frac{1}{c}\vec{V_R}\cdot\widehat{Direction}.$$

The nulling protocol adjusts the transmit node frequency and receiver node frequency due to their velocity projections onto the $\widehat{Null}$ direction $$\frac{\Delta f_T}{f} = -\frac{1}{c}\vec{V_T}\cdot\widehat{Null} + \frac{1}{c}\vec{V_R}\cdot\widehat{Null}.$$

The net frequency shift seen by the receiver node 104 is the sum of all terms:

$$\frac{\Delta f_{net}}{f} = \frac{1}{c}\vec{V_T}\cdot\widehat{Direction} - \frac{1}{c}\vec{V_R}\cdot\widehat{Direction} - \frac{1}{c}\vec{V_T}\cdot\widehat{Null} + \frac{1}{c}\vec{V_R}\cdot\widehat{Null}.$$

The net frequency shift for the 3D moving receiver node 104 approach is not easy to show pictorially but can be inspected with mathematical equations to arrive at useful conclusions. The first two terms are the Doppler correction (DC) offset and the last two terms are the null dependent terms. Since the $\widehat{Null}$ is the independent variable, the maximum occurs when $(\vec{V_R}-\vec{V_T})$ and $\widehat{Null}$ are parallel and is a minimum when they are antiparallel. Furthermore, the relative speed is determined by the amplitude $$\text{Amplitude} = \frac{|\vec{V_R} - \vec{V_T}|}{c}.$$

Lastly, the net frequency is zero when the $\widehat{Null}$ is parallel (i.e., parallel in same direction, as opposed to anti-parallel) to $\widehat{Direction}$:

$$\frac{\Delta f_{net}}{f} = 0 \text{ when } \frac{1}{c}\vec{V_T}\cdot\widehat{Direction} - \frac{1}{c}\vec{V_R}\cdot\widehat{Direction} =$$

-continued $$\frac{1}{c}\vec{V_T}\cdot\overrightarrow{Null} - \frac{1}{c}\vec{V_R}\cdot\overrightarrow{Null} \text{ or, } (\vec{V_T}-\vec{V_R})\cdot\overrightarrow{Direction} = (\vec{V_T}-\vec{V_R})\cdot\overrightarrow{Null}$$

For the 3D case:

The amplitude is consistent with the relative velocity between transmitter node 102 and receiver node 104

$$\left[\frac{|\vec{V_R}-\vec{V_T}|}{c}\right].$$

The net frequency shift is zero when the 'Null' angle is in the receiver node direction, e.g., $(\vec{V_T}-\vec{V_R})\cdot\overrightarrow{Direction}=(\vec{V_T}-\vec{V_R})\cdot\overrightarrow{Null}$).

The minimum occurs when the 'Null' is aligned with the relative velocity direction.

Referring still to FIG. 6, in some embodiments, the system (e.g., the multi-node communications network 100) may include a transmitter node 102 and a receiver node 104. Each node of the transmitter node 102 and the receiver node 104 may include a communications interface 110 including at least one antenna element 112 and a controller operatively coupled to the communications interface, the controller 106 including one or more processors, wherein the controller 106 has information of own node velocity and own node orientation. The transmitter node 102 and the receiver node 104 may be in motion (e.g., in two dimensions or in three dimensions). The transmitter node 102 and the receiver node 104 may be time synchronized to apply Doppler corrections associated with said node's own motions relative to a common reference frame (e.g., a common inertial reference frame (e.g., a common inertial reference frame in motion or a stationary common inertial reference frame)). The common reference frame may be known to the transmitter node 102 and the receiver node 104 prior to the transmitter node 102 transmitting signals to the receiver node 104 and prior to the receiver node 104 receiving the signals from the transmitter node 102. In some embodiments, the system is a mobile ad-hoc network (MANET) comprising the transmitter node 102 and the receiver node 104.

In some embodiments, the applying of the Doppler corrections associated with the receiver node's own motions relative to the common reference frame is based on a common reference frequency. For example, a common reference frequency may be adjusted by a node's own motions to cancel out those motions in reference to the null angle. This common reference frequency may be known by each node prior to transmission and/or reception of the signals. In some embodiments, calculating the net frequency change seen by the receiver node 104 is based on the common reference frequency. For example, the net frequency change may be a difference between a measured frequency of the signals and the common reference frequency.

For purposes of discussing the receiver node 104, a "source" generally refers to a source of a received signal, multiple sources of multiple signals, a single source of multiple signals, and/or the like. For example, a source may be a transmitter node 102 configured to apply Doppler corrections as disclosed herein and in applications from which priority is claimed and/or incorporated by reference. In this regard, a receiver node 104 may determine one or more attributes of the source (e.g., bearing between the receiver node 104 and the source, bearing of the velocity of the source, amplitude/speed of the velocity, range, and the like). In some embodiments, the receiver node 104 and the source (e.g., transmitter node 102) are configured to use a same, compatible, and/or similar Doppler correction, protocol, common reference frame, common reference frequency, time synchronization, and/or the like such that the receiver node 104 may determine various attributes of the source. Note, in some embodiments, that one or more of these may be known ahead of time, be determined thereafter, included as fixed variable values as part of the protocol, and/or determined dynamically (in real time) as part of the protocol. For example, the protocol may determine that certain common reference frames should be used in certain environments, such as using GPS coordinates on land and a naval ship beacon transmitter common reference frame location (which may be mobile) over certain areas of ocean, which may dynamically change in real time as a location of a node changes.

In some embodiments, the transmitter node 102 and the receiver node 104 are time synchronized via synchronization bits associated with acquisition. For example, the synchronization bits may operate as physical layer overhead.

In some embodiments, the transmitter node 102 is configured to adjust a transmit frequency according to an own speed and an own velocity direction of the transmitter node 102 so as to perform a transmitter-side Doppler correction. In some embodiments, the receiver node 104 is configured to adjust a receiver frequency of the receiver node 104 according to an own speed and an own velocity direction of the receiver node 104 so as to perform a receiver-side Doppler correction. In some embodiments, an amount of adjustment of the adjusted transmit frequency is proportional to a transmitter node 102 velocity projection onto a Doppler null direction, wherein an amount of adjustment of the adjusted receiver frequency is proportional to a receiver node 104 velocity projection onto the Doppler null direction. In some embodiments, the receiver node 104 is configured to determine a relative speed between the transmitter node 102 and the receiver node 104. In some embodiments, the receiver node 104 is configured to determine a direction that the transmitter node 102 is in motion and a velocity vector of the transmitter node 102. In some embodiments, a maximum net frequency shift for a Doppler correction by the receiver node 104 occurs when a resultant vector is parallel to the Doppler null direction, wherein the resultant vector is equal to a velocity vector of the receiver node 104 minus the velocity vector of the transmitter node 102. In some embodiments, a minimum net frequency shift for a Doppler correction by the receiver node 104 occurs when a resultant vector is antiparallel to the Doppler null direction, wherein the resultant vector is equal to a velocity vector of the receiver node 104 minus the velocity vector of the transmitter node 102. In some embodiments, a net frequency shift for a Doppler correction by the receiver node 104 is zero when a vector pointing to the receiver node from the transmitter node 102 is parallel to the Doppler null direction.

Figure 7:
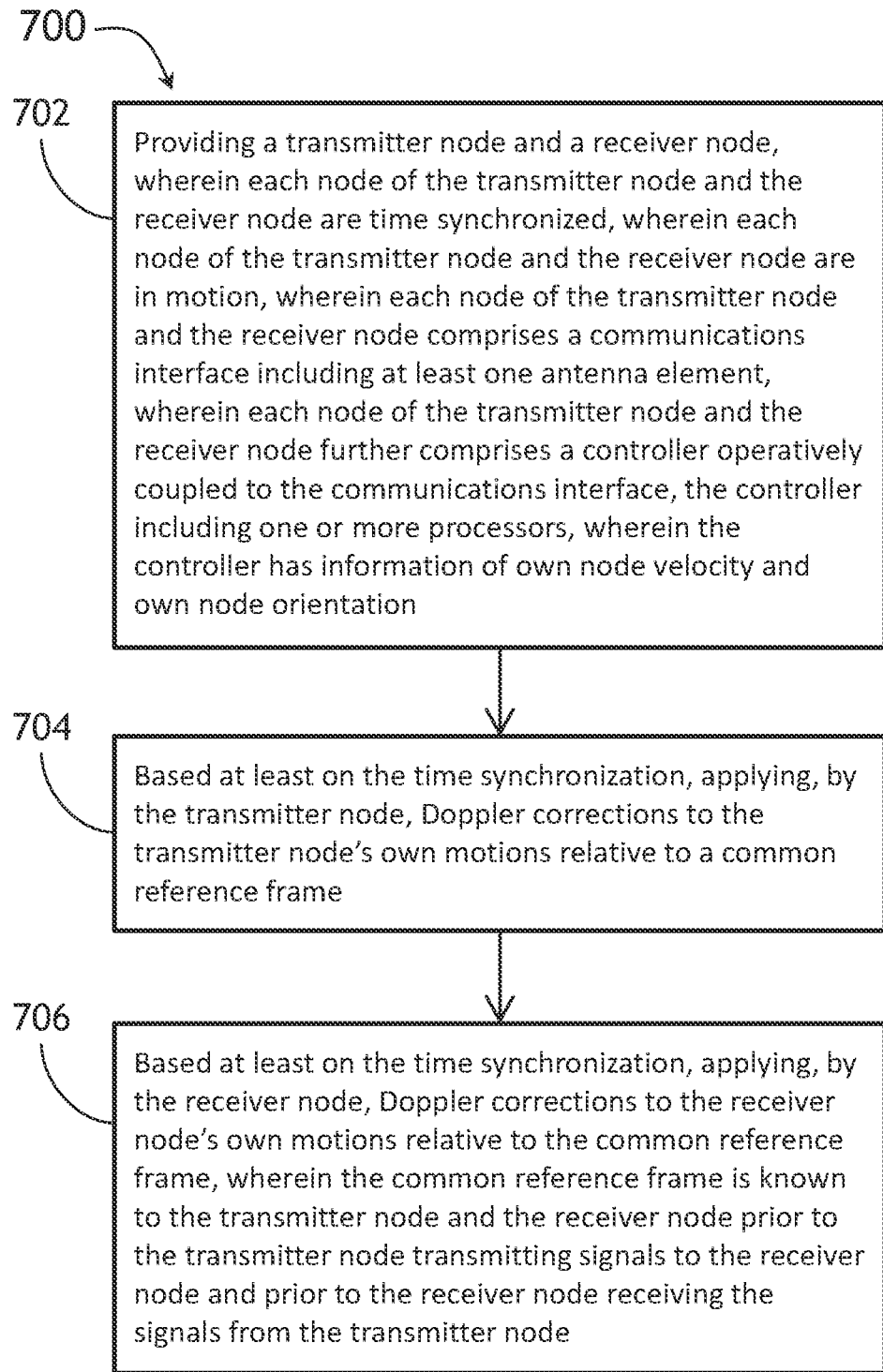
FIG. 7 is a flow diagram illustrating a method according to example embodiments of this disclosure.

Referring now to FIG. 7, an exemplary embodiment of a method 700 according to the inventive concepts disclosed herein may include one or more of the following steps. Additionally, for example, some embodiments may include performing one or more instances of the method 700 iteratively, concurrently, and/or sequentially. Additionally, for example, at least some of the steps of the method 700 may be performed in parallel and/or concurrently. Additionally, in some embodiments, at least some of the steps of the method 700 may be performed non-sequentially.

A step 702 may include providing a transmitter node and a receiver node, wherein each node of the transmitter node and the receiver node are time synchronized, wherein each node of the transmitter node and the receiver node are in motion, wherein each node of the transmitter node and the receiver node comprises a communications interface including at least one antenna element, wherein each node of the transmitter node and the receiver node further comprises a controller operatively coupled to the communications interface, the controller including one or more processors, wherein the controller has information of own node velocity and own node orientation.

A step 704 may include based at least on the time synchronization, applying, by the transmitter node, Doppler corrections to the transmitter node's own motions relative to a common reference frame.

A step 706 may include based at least on the time synchronization, applying, by the receiver node, Doppler corrections to the receiver node's own motions relative to the common reference frame, wherein the common reference frame is known to the transmitter node and the receiver node prior to the transmitter node transmitting signals to the receiver node and prior to the receiver node receiving the signals from the transmitter node.

Further, the method 700 may include any of the operations disclosed throughout.

The null scanning technique discussed herein illustrates a system and a method for spatial awareness from resolving the temporal spatial characteristics of the transmitter node's 102 radiation. This approach informs the receiver node 104 of the relative speed between the transmitter node 102 and receiver node 104 as well as the transmitter node direction and transmitter node velocity vector. This approach includes scanning through all directions and has a high sensitivity (e.g., low net frequency shift) when the null direction is aligned with the transmitter node direction. This approach can be implemented on a highly sensitive acquisition frame which is typically much more sensitive than explicit data transfers which allow for the ultra-sensitive spatial awareness with relatively low power.

This sentence may mark an end to the (at least partially) reproduced language from U.S. patent application Ser. No. 17/857,920 corresponding to the (at least partially) reproduced FIGS. 1-7. However, note that this paragraph is nonlimiting, and changes may have been made and language added or removed, and not all the language above or corresponding figures above are necessarily reproduced from U.S. patent application Ser. No. 17/857,920.

Examples of doppler nulling methods include, but are not limited to, methods and other descriptions (e.g., at least some theory and mathematical basis) are disclosed in U.S. patent application Ser. No. 17/233,107, filed Apr. 16, 2021, which is hereby incorporated by reference in its entirety; U.S. patent application Ser. No. 17/534,061, filed Nov. 23, 2021, which is hereby incorporated by reference in its entirety; and U.S. patent application Ser. No. 17/857,920, filed Jul. 5, 2022, which is hereby incorporated by reference in its entirety. In embodiments, doppler nulling methods allow for benefits such as, but not limited to, relatively quickly and/or efficiently detecting transmitter nodes and determining transmitter node attributes (e.g., transmitter node speed, transmitter node bearing, relative bearing of transmitter node relative to receiver node, relative distance of transmitter node relative to receiver node, and the like).

Figure 8:
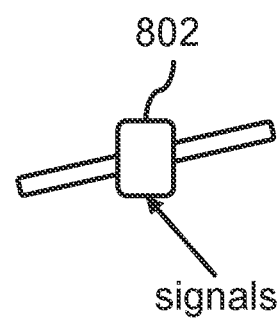
FIG. 8 is simplified diagram of a system including receiver nodes embodied in one or more platforms, in accordance with one or more embodiments of the present disclosure.
Figure 8:
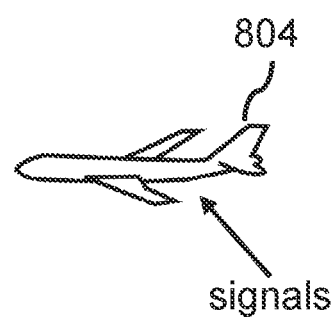

Referring now to FIG. 8, a system 800 is described, in accordance with one or more embodiments of the present disclosure. The embodiments and enabling technology of the multi-node communications network 100 is incorporated herein by reference as to the system 800. The system 800 may include, one or more of the transmitter nodes 102 and receiver nodes 104. In some embodiments, the receiver nodes 104 may be embodied within one or more platforms. For example, the receiver nodes 104 may include a platform. The platform may be satellite 802, such as, but not limited to, a low-earth orbit (LEO) satellite. By way of another example, the transmitter nodes 102 may include an aircraft 804 or another terrestrial platform.

Each of the satellite 802 and the aircraft 804 may transmit and receive signals for doppler nulling purposes. The satellite 802 is a relatively a fast-moving platform, such that the signals received by the receiver node 104 experience significant doppler effects. The aircraft 804 is a relatively a slow-moving platform, such that the signals received by the receiver node 104 experience reduced doppler effects compared to the satellite 802.

A Doppler-nulling transmitter induces modulation having an amplitude according to its own-platform Doppler effects and may implement the modulation in analog fashion with essentially infinite resolution. The transmission of Doppler-nulling modulation may be produced in essentially analog fashion with each transmission's exact frequency varying along a continuous spectrum.

The receiver node 104 may receive the signals from the transmitter node. In embodiments, the receiver node 104 may quantize the signals to produce digital signals. The receiver node 104 may include a quantizer to perform the quantization. For example, the receiver node 104 may include an analog-to-digital converter (ADC) or the like to quantize the signals. The digitized signals may include a magnitude based on the own-platform Doppler effects. The receiver node 104 is configured to digitize the plurality of signals using a step size. The receiver node 104, in order to process the signal with modern signal processing techniques, digitizes the received signals with finite resolution. The receiver node 104 (due to hardware size and power constraints) may be limited to digitization using a finite number of discrete frequency steps. The receiver node 104 then determines a modulation amplitude of the plurality of signals. The modulation amplitude is determined based on the digitization.

The issue with digitization is that the receiver node 104 needs to accommodate both very fast-moving platforms exhibiting large Doppler frequency shifts and very slow-moving platforms exhibiting only small Doppler frequency shifts, while simultaneously providing fast discovery, good sensitivity and high accuracy for each platform type. In embodiments, platforms experiencing significantly different Doppler effects can be accommodated by the receiver node 104 using one or more methods of adaptive digitization, as will be described further herein. The receiver node 104 accommodates both relatively fast-moving platforms and relatively slow-moving platforms while simultaneously providing fast discovery, good sensitivity, and high accuracy for each platform type using the method of adaptive digitization.

Embodiments of the present disclosure describe adjusting to various Doppler needs using adaptive digitization. The receiver node 104 adjusts the step size based on the modulation amplitude. The receiver node 104 employs adaptive tracking with variable quantization size according to the modulation amplitude. A high-resolution analog-to-digital process can be employed for slow-moving platforms, while an analog-to-digital process having much larger quantization steps can be used for fast-moving platforms. The primary benefit provided from this approach is the ability to use a single Doppler-nulling receiving system for a wide range of potential platforms—from relatively slow-moving vehicles such as automobiles, to very fast-moving vehicles such as Low-Earth-Orbit (LEO) satellites.

The process of detection for Doppler-nulling can involve a highly sensitive frequency selective process which only provides peak sensitivity over the narrow range of frequencies for which Doppler-nulling can reduce the offset frequency to near zero. Following the initial detection, the receiver node 104 tracks the Doppler-nulling modulation as the frequency increases and decreases in sinusoidal fashion. As Doppler-nulling changes the modulating frequency, the tracking process simultaneously follows the modulating frequency in order to maintain sensitivity. The process is iteratively performed to achieve the sensitivity.

For, example, when tracking slow-moving platforms (say, for example, having 10 Hz Doppler frequency shift), a small quantization step size can be selected, whereas a larger quantization step size can be selected when tracking a fast-moving LEO satellite (say, for example with 10 kHz Doppler frequency shift). In this regard, the doppler shift of the signals received by the receiver node 104 due to the node's own motions is between 10 Hz and 10 kHz. It is further contemplated that the doppler shift of the plurality of signals may be between 1 Hz and 10 MHz. This simple example illustrates three orders of magnitude difference in quantization size although in each case the same tracking algorithm can provide the same angular resolution regardless of the associated platform Doppler quantization step sizes employed. To a large extent, angular accuracy depends upon the number of quantization steps required to cover a vehicle's Doppler effects range, not the specific Doppler frequency observed. With a relatively small number of fixed discrete frequency steps, the receiver node 104 may simultaneously provide the resolution needed for both slow-moving platforms, which exhibit small amounts of Doppler frequency shift and fast-moving platforms which exhibit large amounts of Doppler frequency shift.

Figure 9:
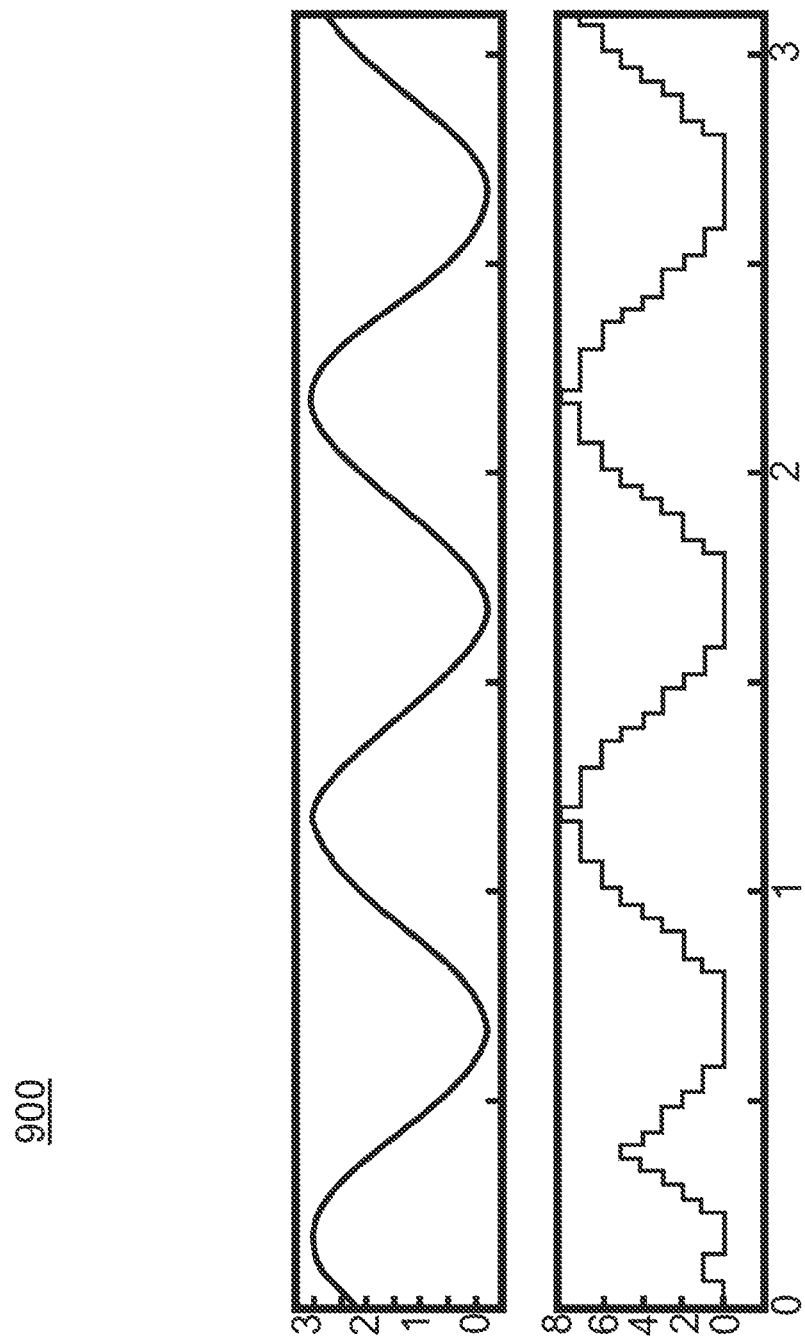
FIGS. 9-12 are graphs, in accordance with one or more embodiments of the present disclosure.

Referring now to FIG. 9, a graph 900 is described, in accordance with one or more embodiments of the present disclosure. The graph 900 provides a quantization example for Doppler-nulling. The Doppler-nulling signal is depicted as a sinusoidal signal. Tracking of the Doppler-nulling signal, as seen in the quantized reconstruction of the input sinusoid, begins at about 0.35 seconds. An accurate reconstruction of the signal can be accomplished using only the nine steps seen in the figure. The sinusoidal nature of Doppler-nulling modulation causes the modulation to be predictable. In particular, the platform may not experience sufficiently rapid changes in velocity to impact the Doppler frequency shift. The future frequencies may then be largely predictable from past frequencies. When the observed Doppler-nulling modulation frequency changes sufficiently, the next digital frequency step is employed until the frequency again changes sufficiently to take yet another digital step.

Figure 10:
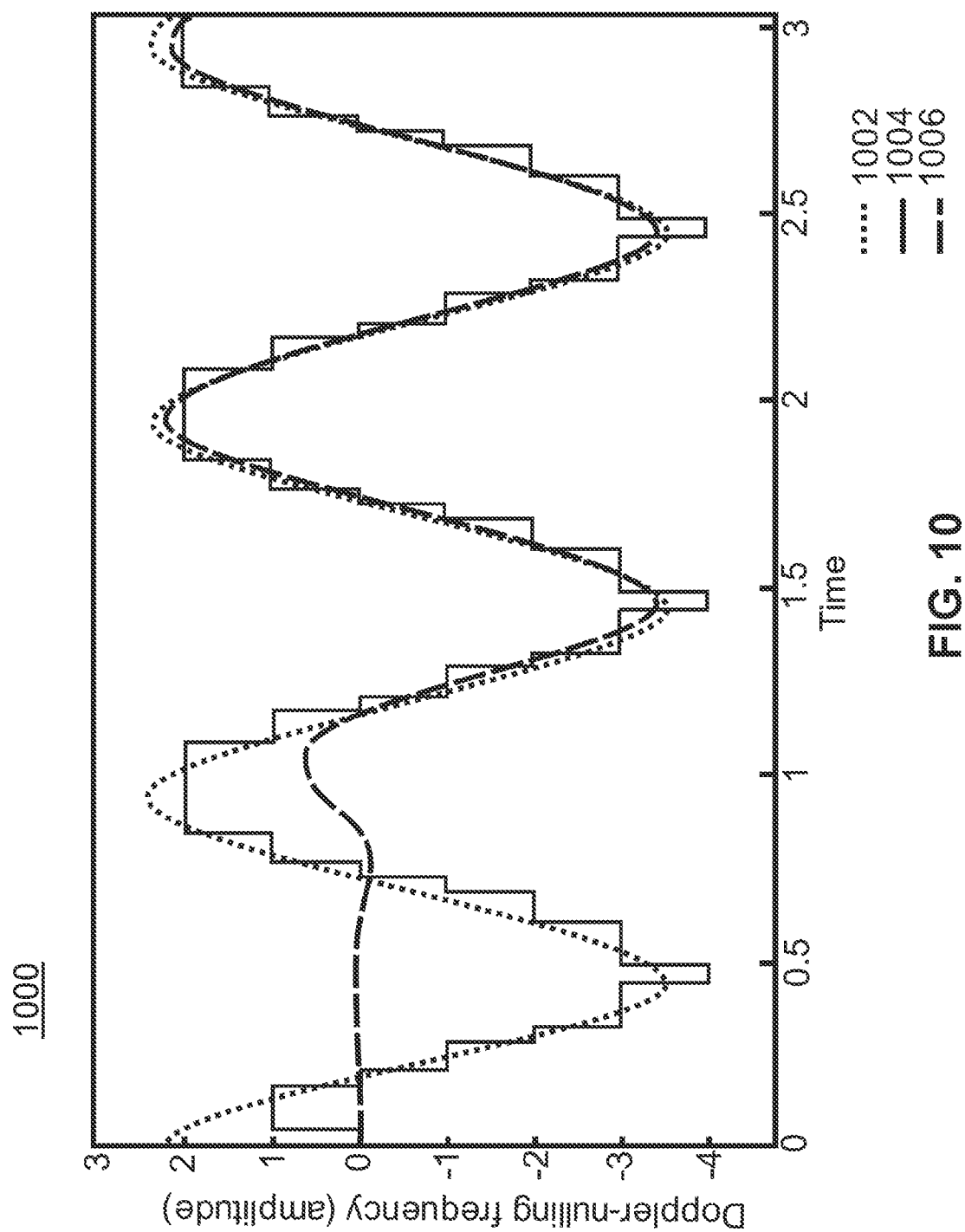

Referring now to FIG. 10, a graph 1000 is described, in accordance with one or more embodiments of the present disclosure. The graph 1000 depicts the transmitted Doppler nulling modulation profile 1002, the received digitization 1004 or quantization of the profile 1002 in the receiver node 104, and a digitized signal 1006. The digitized signal 1006 is generated from the received digitization 1004 after resampling and filtering. The digitized signal 1006 is a high-resolution reconstruction of the profile 1002. In this regard, the reconstructed signal closely resembles the original.

Figure 11:
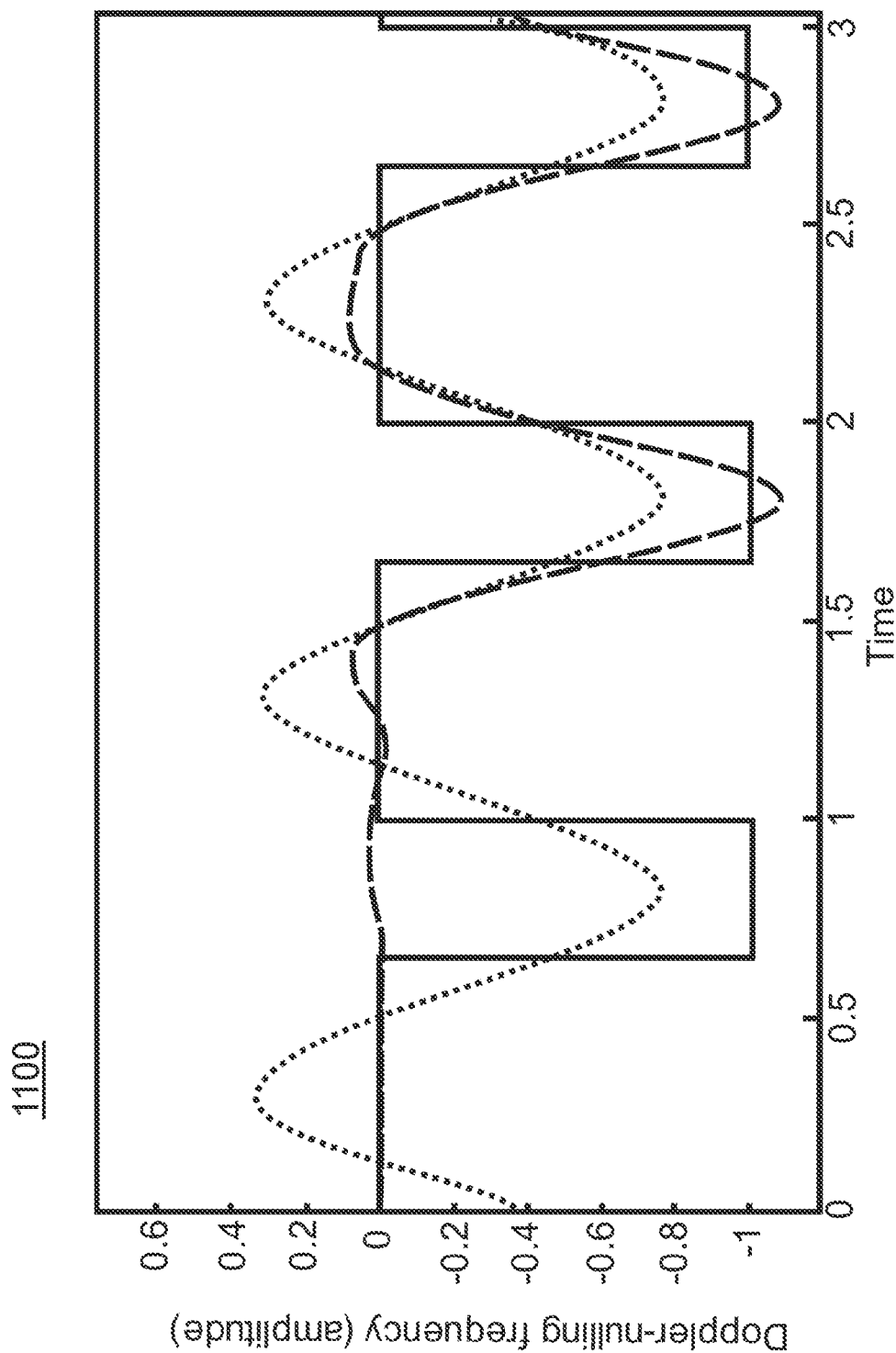

Referring now to FIG. 11, a graph 1100 is described, in accordance with one or more embodiments of the present disclosure. The graph 1100 depicts the transmitted Doppler nulling modulation profile 1102, the received digitization 1104 or quantization of the profile 1102 in the receiver node 104, and a digitized signal 1106. The digitized signal 1106 is generated from the received digitization 1104 after resampling and filtering. The received digitization 1104 does not include a sufficient step size, such that the digitized signal 1106 does not closely resemble the profile 1102. This graph 1100 provides an instance where maintaining the same digital resolution in the receiver, for platforms exhibiting different amounts of Doppler, fails to provide an accurate reproduction of the original profile. The transmitted signal exhibits much lower Doppler shift such that only one quantization step is available for digitization and the reconstructed digital signal 1106 does not accurately represent the original Doppler-nulling signal.

Figure 12:
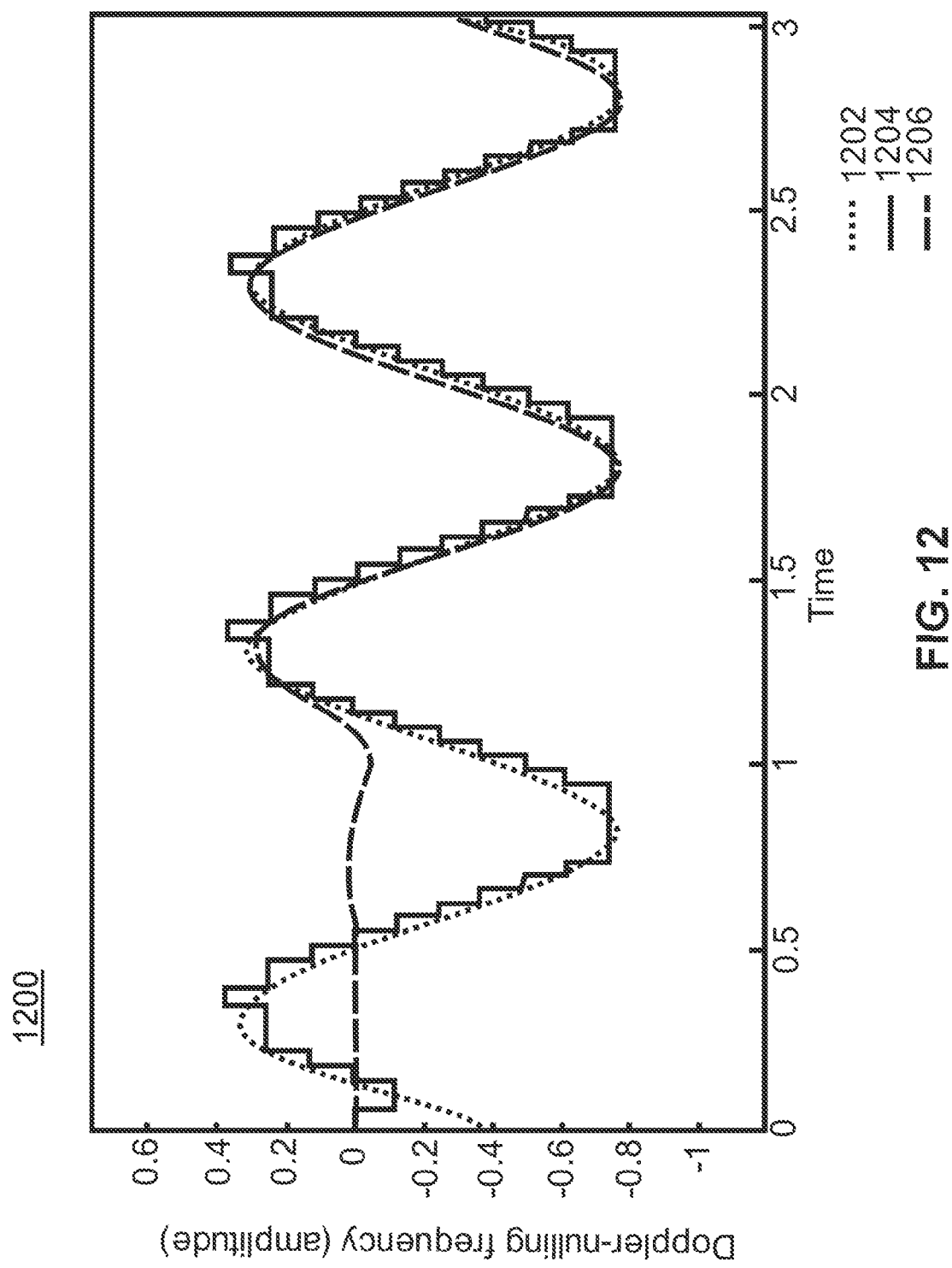

Referring now to FIG. 12, a graph 1200 is depicted, in accordance with one or more embodiments of the present disclosure. The graph 1200 depicts the transmitted Doppler nulling modulation profile 1202, the received digitization 1204 or quantization of the profile 1202 in the receiver node 104, and a digitized signal 1206. The digitized signal 1206 is generated from the received digitization 1204 after resampling and filtering. The received digitization 1204 includes a sufficient step size, such that the digitized signal 1206 closely resembles the profile 1202.

The receiver node 104 may discern when only a small number of quantization steps are being employed. The receiver node 104 can, in this instance, automatically adapt the quantization size to use smaller frequency steps, as appropriate for the signal being digitized. Adapting the quantization size provides a good reproduction of the original signal without changing any system parameters other than quantization step size. The digitized signal 1206 may then accurately represents the original signal in both amplitude and phase, even though the Doppler-nulling modulation exhibited on the input signal is much smaller than were seen in earlier figures.

Figure 13:
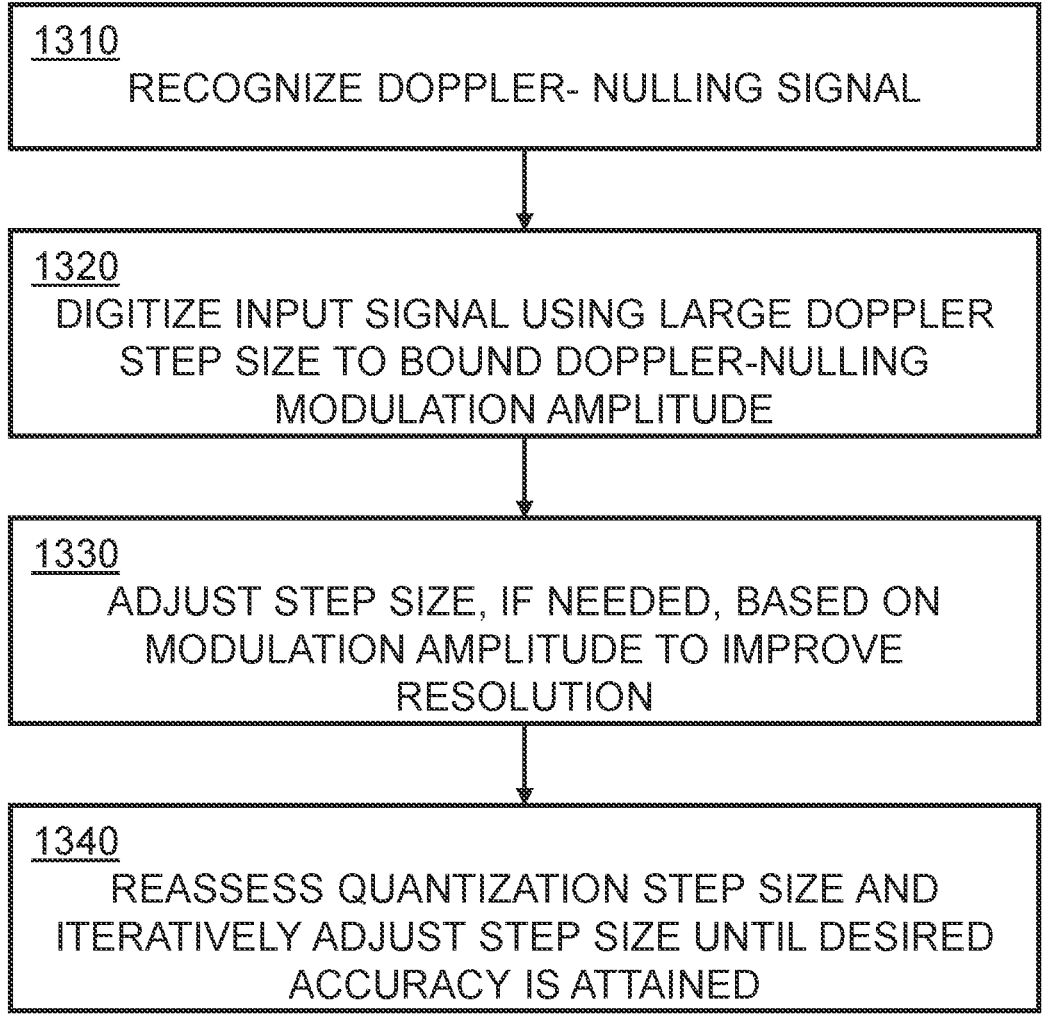
FIG. 13 is a flow diagram of a method, in accordance with one or more embodiments of the present disclosure.

Referring now to FIG. 13, a flow diagram of a method 1300 is described, in accordance with one or more embodiments of the present disclosure.

In a step 1310, the receiver node 104 recognizes a transmitted Doppler-nulling signal. The receiver node 104 may recognize the transmitted Doppler-nulling signal as a result of being able to correlate on a near zero Doppler signal at the bearing angle of the Doppler-nulling transmitter, or via a similar method.

In a step 1320, the receiver node 104 digitizes the Doppler-nulling signal. The receiver node 104 digitizes the Doppler-nulling signal using a step size. The step size may be referred to as a Doppler step size, a frequency step size, a quantization step size, and the like. The step size may be initially set at a relatively large step size in order to ascertain Doppler-nulling modulation amplitude. A modulation amplitude is determined from the digitized signal. The observed modulation amplitude is based on both the transmitted node's Doppler-nulling modulation and the received node's own motions of the receiver node 104. In particular, the modulation amplitude may be proportional to the motion of the transmitter and the receiver node 104. The step size may be set to a larger amount of time per step to enable determining higher modulation amplitudes, and similarly velocities of nodes with higher velocities (e.g., the satellite 802).

In a step 1330, the receiver node 104 adjusts the step size. The receiver node 104 determines the adjustment to the step size based on the modulation amplitude. In some embodiments, the receiver node 104 may determine the step size needed to quantize the signal to the desired accuracy, while also not exceeding a given step size to reduce processing requirements. The receiver node 104 adjusts the step size accordingly. For example, the receiver node 104 may reduce the step size, thereby improving the resolution.

In a step 1340, the receiver node 104 reassesses the modified signal's output level. The receiver node 104 may repeat any of the steps 1320, 1330, and/or 1340 based on the reassessment, as needed, until the desired output level is achieved. For example, the receiver node 104 may iteratively digitize the plurality of signals using the step size, determine the modulation amplitude of the plurality of signals, and adjust the step size based on the modulation amplitude. The step size may be set to a smaller amount of time per step to enable determining smaller modulation amplitudes, and similarly velocities of nodes with lower velocities (e.g., the aircraft 804).

By utilizing this method, the receiver node 104 can cover the entire range of Doppler shifts (i.e., from LEO satellites to stationary nodes) without needing a priori knowledge of those shifts for optimum performance. Doppler-nulling modulation can thus be recovered across orders of magnitude Doppler effects. High accuracy can be achieved across an extremely wide range of possible Doppler effects; from less than 1 kHz, for example, to more than 1 MHz.

It is contemplated that the adaptive doppler-nulling digitization may be applied to both omni and directional systems in order to improve resolution and ultimately the accuracy available from Doppler-nulling.

Referring generally again to FIGS. 1A-13.

Broadly speaking, doppler bearing (e.g., direction a node is traveling relative to a null direction) and relative range of a transceiver (Tx) node (e.g., range/distance between the Tx node and a receiver (Rx) node) may be determined using concepts of one or more embodiments of the present disclosure.

Generally, doppler shift describes the change in a signal from a Tx node to a Rx node (e.g., red shift of light emanating from a star, change in frequency of a sound wave). The doppler shift is a function of the moving vectors between such nodes (e.g., position, velocity, acceleration). Further, over time, the doppler shift will change as a function of the relative bearing between such nodes.

In some embodiments, Tx nodes and Rx nodes may adjust the phase (e.g., by changing the phase of a transmitted waveform that is transmitted, and/or by analytically/computationally changing the phase of a received waveform) of a waveform to mimic/cancel the effect of a doppler shift (or theoretical doppler shift). For example, a moving and/or static Tx node may adjust the phase of a signal the Tx node transmits to mimic what the phase would look like with a different doppler shift (and/or lack thereof) (e.g., corresponding to a different relative velocity of the Tx node). Similarly, for example, a Rx node may adjust (e.g., computationally adjust) the phase of a signal received from the Tx node to cancel out the relative velocity of the Rx node (and/or any other adjustment). In one example, the Rx node adjusts the phase of a received signal for multiple bearings of the Rx node (over time, as the Rx node bearing changes). In another example, the Rx node adjusts the phase for multiple bearings of the Tx node. In another example, the Rx node adjusts the phase for multiple bearings of the Rx node and for multiple bearings of the Tx node.

In some embodiments, a received signal (e.g., adjusted by the Tx node before sending) is compared to an expected signal (e.g., expected function, signal to noise ratio (SNR), spread spectrum symbol sequence, frequency, amplitude, timing of symbols, timing of pulses, and/or the like). Such a comparison may be used to acquire/generate a probability function. For example, multiple of such comparisons (e.g., over time) may be used for different bearings to acquire/generate an expected bearing. In another example, a single comparison (e.g., as described above) may be used by a Rx node to adjust (e.g., digitally) for both the Tx node adjustment and the Rx node adjustment to obtain (at least) the bearing of the Tx node.

In some embodiments, a range (i.e., distance) between nodes is determined (configured to be determined) based on a time delay between a transmission and a reception between two nodes. For example, a range between nodes may vary as a function of the relative propagation delay of signals between the nodes.

Variations of the embodiments described above may be utilized to achieve a variety of benefits. At least some of the nonlimiting variations are described below.

In some embodiments, various relative attributes of one or more Tx nodes may be determined, generated, and the like by a Rx node based on transmissions (e.g., signals, communications, RF signals, symbols, phases, and the like) of the one or more Tx nodes. For example, in at least this context, relative may mean a Tx node relative to a reference frame, position, bearing, vector, and the like (e.g., the Tx node relative to the Rx node).

In one example, relative bearing may be determined. In another example, relative range may be determined. In another example, relative position may be determined. In another example, relative velocity may be determined. In another example, relative acceleration may be determined. For example, in some embodiments, all of the above relative attributes may be determined from one or more signals.

In at least some embodiments, generally, certain knowledge may be used by a Rx node (e.g., knowledge that is already known, apriori, standardized, determined dynamically based on a pre-determined and/or ascertainable protocol, and/or the like) to determine relative attributes (e.g., bearing, velocity, range, and the like) of the Tx node. For example, a bearing reference, frequency reference, and protocol may be used to determine such relative attributes. Note that, in a sense, knowing the protocol may inherently mean knowing the bearing reference and the frequency reference if such information is based on the protocol. In some examples, a time reference may be used to determine the relative attributes.

The bearing reference may be referred to as a null direction, null reference, common null direction, common null direction of a common reference frame, and the like. The bearing reference may be relative to a specific position (e.g., relative to the north pole in Earth-based coordinates, or any arbitrary position). Note that bearing reference may be static and/or change over time and still be used (e.g., change many times per second, with the bearing reference known at each time interval based on a commonly known and/or ascertainable protocol).

In at least some embodiments, the frequency reference is based on a protocol. In one example, the frequency reference may be an expected reference frequency. In another example, the frequency reference is an ascertainable reference frequency. For example, the frequency reference may be a frequency of symbols within the same bandwidth that are modulated. In another example, the frequency reference may a frequency of symbols within aperiodic bandwidths that are modulated. In one example, the Tx node signal preamble (without the transmission message) has a frequency equal to the reference frequency. In one example, the Tx node signal message (the message being transmitted) has a frequency equal to the reference frequency.

In some embodiments, at least the frequency reference is determined based on a protocol (e.g., calibration protocol) at the start of operations/communications. For example, a static Tx node (reference point) in or near an area (e.g., field to be harvested) may be used to transmit to a static Rx node (e.g., tractor, or any other Rx node) to establish a bias between such nodes (and therefore the frequency reference may be determined). Next, when the Rx node (tractor) moves over time (relative velocity), any shift in frequency may be known to be purely a doppler shift (e.g., and used to determine the doppler shift).

In some embodiments, a time reference may be known by the Tx node and known and/or ascertainable by the Rx node. For instance, the time reference could be plus or minus a few seconds and used to determine which portion of a repeated cyclical pattern of a changing frequency protocol that a Tx is using. For example, a protocol may be configured to change the frequency of a signal every 10 seconds to a different frequency band. In such an example, in some embodiments, a Rx node may need to know which time reference (and corresponding frequency band) a signal is within in order to determine the doppler shift of the signal because the doppler shift is based on the expected frequency of the frequency band. If the wrong frequency band is assumed, the doppler shift could be incorrectly calculated. In some embodiments, to determine range, time reference may need to be accurate to within a few microseconds or less. For example, the transmission time of a signal having a particular speed of transmission through a particular medium (and the time reference of when such a signal was expected to have been sent) may be used, in combination of when such a signal was received by an Rx node, to calculate the time for the distance to travel between the Tx node to the Rx node. Such a transmission time can be used along with the expected speed of transmission (e.g., speed of light, speed of sound in a particular medium, and the like) to determine the range (distance) between the Tx node and the Rx node. Note that similar to the frequency reference (e.g., using static Tx and Rx nodes during a calibration protocol phase of communication) or differently, the time reference may be capable of being calibrated at the start of a protocol.

Note that protocol, generally, may mean any protocol (e.g., communication protocol). For example, a protocol may exist to determine and/or vary any attribute (e.g., phase, frequency, time), metric, sequence of events (patterns of signals, etc.), steps, sub-steps, conditional steps, and/or the like of a signal and/or signal recipe over time. For example, a protocol may be pre-determined to vary a bearing reference (null direction) in 10-degree increments, cyclically. The bearing reference direction at any given moment in time could depend on a pre-determined routine (e.g., 10°, 190°, 20°, 200°, 30°, 210°, etc. until all 36 directions are rotated through, and then the same or a different pattern, over the same or a different range of directions may be used). In another example, a determinable metric (e.g., time of day, continent, and the like) could be used to dynamically determine the bearing reference pattern (or any other protocol attribute). For example, the frequency may be determined by the protocol and dynamically change in any way based on the protocol and any other input (e.g., cyclically change, change based on a received signal, etc.).

Note that the protocol may be based on any known and/or ascertainable recipe (mechanism, method) such that the Rx may determine the bearing reference (null direction) (e.g., such that the Rx may determine the phase adjustment made by the Tx based on the bearing reference). In some embodiments, time (e.g., time of day) is used to determine the protocol, but the protocol may also be based on other metrics such as Pseudo-random number (PN) code, and the like. Ascertainable may mean ascertainable by the receiver (e.g., based on the protocol and any other information).

In some embodiments, a protocol may be configured to work based on (or works better with) certain assumptions holding true. Such assumptions may, in some embodiments, help further understand the embodiments themselves. Such assumptions may include media propagation assumptions. For example, such media propagation assumptions, if incorrect, may impact the accuracy of the determined doppler shift and/or signal transmissions time. Such assumptions may include having a direct line of sight between the Tx node and the Rx node and/or having a transmission without impairments (e.g., without multipath and/or reflections).

In some embodiments, different spreads of spectrum (e.g., spectrum bandwidth) of a Tx node signal may be used. For example, different spreads of spectrum may be used for one or more of the following purposes: to determine/ascertain different time references, and/or bearing references; to determine the transmitter (e.g., different transmitters may use different spectrum spread); to target different receivers (e.g., different receivers may be configured to receive/analyze only certain spectrum spreads) (e.g., if desire is to add additional information to a transmission, such as a message); and/or to disclose other information. Such embodiments may use any methods or systems related to Transmission security (TRANSEC) modes of operation and/or frequency hopped spread spectrum (FHSS) modes of operation.

In some embodiments, but not necessarily all embodiments, a non-zero relative velocity between a Tx node and a Rx node is required (i.e., required to exist, but not necessarily known by the Rx node yet) to determine at least one or more of the relative attributes (e.g., without relative motion, some relative attributes may not be ascertainable using certain protocols). For example, where a Tx node and an Rx node are mobile (moving) relative to a reference frame and relative to each other. In another example, where a Tx node is static and the Rx node is mobile. In another example, where the Tx node is mobile, and the Rx node is static.

In some embodiments, a Tx node may be static relative to an Rx node (i.e., zero relative velocity) and some or all relative attributes may still be ascertainable. For example, a non-Earth reference frame may be used such that the Tx node and Rx node are mobile relative to the non-Earth reference frame. In some embodiments, an attribute that is ascertainable between nodes having zero-relative velocity is that the Rx node may be able to determine that the Tx node is static relative to the Rx node (e.g., lack of doppler shift, the received signal being equal to an expected signal, and the like).

In at least some embodiments, one or more waveform types may be used (e.g., used as the signal wherein a doppler shift (or lack thereof) may be observed). For example, an electromagnetic waveform may be used (e.g., RF, light, particles such as electrons, neutrons and/or the like). In another example, a pressure wave is used (e.g., sound wave, seismic wave, vibration wave, and/or the like as a P and/or S wave).

In some embodiments, one or more medium and propagation paths are used (and/or configured to be used). For example, one or more of the following may be used: air medium and electromagnetic waveforms, air medium and pressure waveforms, water medium and electromagnetic (e.g., light) waveforms, water medium and pressure waveforms, earth medium and seismic waveforms. Note that any medium and propagation path (or combinations thereof) may be used. For example, empty space (i.e., low earth orbit, a vacuum) may be a medium and an electromagnetic waveform may be used therein.

In some embodiments, a signal to be analyzed for doppler shift that is transmitted by a Tx node to achieve at least some of the benefits of the present disclosure (e.g., determining relative attributes) is adjusted in one or more ways. For example, the adjustment to the signal by a Tx node to cancel/mimic doppler shift (as described throughout this disclosure) may occur once per transmission (e.g., between transmissions) and cycle through bearing reference directions (e.g., 10°, 190°, 20°, 200°, 30°, etc.) as described above without making further adjustments to account for doppler shift. In this regard, the doppler shift may be adjust for a single direction (perspective). In another example, the adjustment to the signal may occur multiple times per transmission and cycle through bearing reference directions, adjusting the doppler shift before each bearing reference direction. In this regard, the doppler shift may be adjusted for each bearing reference direction (all directions). For instance, such adjustment could be performed on the preamble of a transmission (e.g., and it may be part of a protocol to analyze the preamble to obtain the benefits (relative attributes)). In another instance, the adjustment could be done to the traffic/message (e.g., and likewise the protocol could dictate that analysis be performed to the traffic/message portion of a transmission). In some embodiments, adjusting the traffic/message portion for doppler shift results in less/worse SNR (e.g., and may be performed similar in concept to a blind equalization).

In some embodiments, only a single transmission is used to achieve benefits of the present disclosure (e.g., determining relative attributes).

In some embodiments, multiple transmissions are used to achieve benefits of the present disclosure (e.g., determining relative attributes). For example, multiple transmissions from the Tx node may be combined to achieve superior results (e.g., more data may make for a more robust determination of relative attributes.

Continuing with multiple transmission discussion, a Tx node and Rx node may combine info from multiple transmissions in both directions (i.e., where the Rx node transmits according to the same or different protocol), which may result in one or more benefits.

In some embodiments, for example, finer bearing accuracy may be obtained from multiple transmissions. For example, a Tx node may transmit in 10-degree increments (e.g., with the null bearing direction in the direction of transmission) over all 360 degrees. Rx node may receive at least one of such transmissions (e.g., the transmission in the 10 degrees increment that Rx node is located within). Rx node may, based on such received transmission, transmit a second transmission over 0.5-degree increments in the direction of the received transmission (e.g., over a smaller range of directions such as 30 degrees instead of 360 degrees). This pattern may continue in smaller and smaller increments to a high degree of certainty such that at least one node is aware of the other node's relative bearing (e.g., direction relative/between each node).

In some embodiments, one or more other benefits may be obtained from multiple transmissions. For example, higher probability of results may be obtained. In another example, tracking a moving node may be obtained (e.g., using multiple transmissions over time to). In another example, acceleration may be obtained (e.g., by tracking velocity over time). In another example, finer relative timing accuracy may be obtained.

In some embodiments, the protocol is configured to handle a sequence of sub-protocols (sub-steps) for how to handle multiple transmissions between nodes. For example, the increments used in obtaining finer bearing accuracy as described above may be pre-determined (or ascertainable) based upon a known (or ascertainable) protocol.

In some embodiments, multiple transmissions between multiple nodes (e.g., more than two nodes) are utilized and are possible. For example, an Rx node may combine multiple transmissions received from multiple nodes to adapt transmissions (e.g., the Rx node's transmissions). For instance, the Rx node may change the spread spectrum to provide information such as the reference bearing, number of nodes detected by the Rx node, and any other information the Rx node may be configured to communicate. In another instance, concepts used in graph theory may be utilized to adapt transmissions.

Note that descriptions throughout the present disclosure directed to the Tx node may also be applicable to the Rx node in one or more embodiments. For example, the Rx node may initially receive a transmitted signal from the Tx node but may thereafter (or before) transmit a signal itself according to a protocol and may thereby be a transmitting/transceiver (Tx) node itself. In this regard, descriptions and figures directed to a Tx node should not be limited to only the Tx node, and may also apply to the Rx node.

In some embodiments, certain aspects of a signal (e.g., the part of the signal configured to be analyzed per the present disclosure) are analyzed (e.g., to determine the doppler shift and/or any relative attribute). The aspects to be analyzed include functions and metrics. In some examples, the aspects to be analyzed include the SNR and relative velocity by analyzing the frequency offset (e.g., corresponding to the doppler shift). In some examples, the aspects to be analyzed include the protocol for moving through a probability distribution.

In some embodiments, doppler symbol information may be combined with transmitted information.

In some embodiments, multiple doppler bearing reference exchanges may be combined from multiple nodes to refine relative bearing direction between the multiple nodes.

In some embodiments, a temporary bearing reference point with relative poorly calibrated time reference (e.g., more than a few seconds off) may be used initially. For example, reference points and measurement points may be placed, and used to synchronize the time reference to high accuracy between nodes (e.g., to within a couple or single nanosecond). Next, a transmission from a stopped node (e.g., tractor) and other nodes may be used to eliminate frequency offset biases. The result may be that the measurement point (e.g., tractor) can move around (e.g., plow a field) and have accurate time reference and frequency reference to get highly accurate bearing and range.

A Tx and/or Rx node/system having a controller including one or more processors configured to execute program instructions may cause the one or more processors to receive a relative position, bearing, and/or velocity relative of the node relative to a reference bearing, and/or position; determine an adjusted doppler shift based on such a relative position/bearing/velocity; transmit a signal based on the adjusted doppler shift; and/or the like. In another example, a method includes the same/similar steps. In another example, DNS is configured to replace any other positional/navigational system (e.g., GPS, TACAN, radar, etc.) such that position and/or navigation is determined using DNS based systems/methods instead (e.g., but other aspects of the systems are left largely unchanged). In another example, DNS based systems-methods are used to augment (e.g., increase redundancy, increase accuracy by averaging results from multiple systems, and the like) existing position and/or navigation systems/methods. In another example, DNS based systems/methods are used to identify nodes (e.g., Tx nodes). In another example, DNS based systems/methods are used to establish communication links by determining a direction of other nodes such that a directional signal (e.g., either DNS-based or non-DNS based) may be used with such nodes.

In some embodiments, increased accuracy is achieved by analyzing signals from multiple (two or more) Tx nodes. For example, conceptually at least range and relative bearing (between nodes) is ascertainable using concepts herein. If a first Tx node is north and a second Tx node is west of an Rx node, then the relative range of the first Tx node to the Rx node may be combined with the relative bearing (angle) between the second Tx node and the Rx node to obtain a more accurate position in the North/South direction. Vice versa to determine a more accurate position in the West/East direction. In this regard, a combination of range and relative bearing directions may be obtained from a multitude of nodes. Similarly, multiple Rx nodes may be used with a single Tx node to obtain a more accurate position of the Tx node. In another example, multiple nodes in the same or similar or any other direction can be combined, generally, to achieve increased accuracy (e.g., increased confidence interval), via any method (e.g., averaging results, median, removing statistical outliers, and/or any other method for using multiple data points of the same type of measurement to increase accuracy).

In some embodiments, DNS or any other concept disclosed herein may be utilized for elevation determination purposes (e.g., altitude, relative elevation between nodes, etc.). For example, instead of just DNS in 10 degree increments laterally, the DNS can be performed in any increment vertically (e.g., 10-degree increments) and/or laterally. Further, in some embodiments other concepts above may be combined with such a scanning (e.g., finer scanning of 1-degree increments in less than the full 360 degrees).

In some embodiments, DNS or any other concept disclosed herein may be utilized for determining a position of an entity (e.g., vehicle, non-transmitting object, adversarial target, etc.) using one or more nodes (e.g., a swarm of nodes may detect a node location collectively and inform/transmit the position to other nodes of the swarm, such as via data packets, two-way transmissions, and the like). For example, a first node may determine the position of the entity (e.g., using any method such as radar, imagery, etc.) and, in combination of relative attributes/positions between at least some of the other nodes (using DNS or any other concept herein) determine the position of the entity relative to the other nodes (e.g., nodes that did not observe the entity). For example, nodes may know the relative positions to each other and learn the position of the entity based on only a single node learning the position of the entity. Further, for example, any node (e.g., not necessarily the node that determined the entity position) may know an absolute position of at least one node. Based on such an absolute position, the position of the entity (and/or the other nodes) may be determined.

In some embodiments, DNS or any other concept disclosed herein may be utilized for indoor navigation and/or tracking. For example, used for fireman and/or police navigation indoors (e.g., with Tx nodes on each person, to track user locations in a building). Since person velocities are slower, a more accurate method/system may use ultrasound rather than RF transmissions to improve accuracies (e.g., due to slow speed of propagation).

In some embodiments, DNS or any other concept disclosed herein may be utilized with modified existing protocols (e.g., using other techniques). For example, protocols of existing systems may be modified to be backwards compatible with existing radios but also compatible with radios that use DNS methods. For example, existing preambles may already incorporate some doppler analysis, and modifications to such a protocol could be made to allow doppler positioning/ranging using DNS methods disclosed herein.

In embodiments, even if the Doppler nulling protocol is not known to the Rx node 104, the Rx node may observe (e.g., monitor, measure) the net frequency offset as the Tx node 102 covers (e.g., steers to, orients to, directs antenna elements 112 to) a range of Doppler nulling directions (e.g., relative to the arbitrary direction, each Doppler nulling direction having a corresponding Doppler nulling angle ϕ). Accordingly, the Rx node 104 may determine the magnitude of the parameter A of the velocity vector $\vec{V'_T}$ of the Tx node 102, to the degree that the Tx node covers both extremes (e.g., achieves both a minimum and a maximum velocity relative to the Rx node) such that $$A = \frac{f}{c}|\vec{V'_T}|$$

where f is the transmitting frequency of the Tx node and c is the speed of light. For example, each frequency shift point (FSP) detected by the Rx node 104 at a given Doppler nulling direction may correspond to a velocity vector of the Tx node 102 relative to the Rx node. As noted above, and as described in greater detail below, the magnitude parameter A may incorporate a maximum and minimum relative velocity. If, however, the range of Doppler nulling angles ϕ is insufficiently broad, the magnitude parameter A may only include relative maxima and minima for that limited range of Doppler nulling angles (e.g., as opposed to the full 360 degrees of possible Doppler nulling angles.

In some embodiments, the Doppler nulling protocol and set of Doppler nulling directions (and corresponding angles ϕ) may be known to the Rx node 104 and common to all other nodes of the multi-node communications network 100. For example, the Tx node 102 may perform the Doppler nulling protocol by pointing a Doppler null in each Doppler nulling direction and angle ϕ of the set or range of directions as described above. The Rx node 104 may monitor the Tx node 102 as the Doppler nulling protocol is performed and may therefore determine, and resolve, the net Doppler frequency shift for each Doppler nulling direction and angle ϕ.

In embodiments, although both the Tx and Rx nodes 102, 104 may be moving relative to the arbitrary direction, monitoring of the Doppler nulling protocol by the Rx node 104 may be performed and presented in the inertial reference frame of the Rx node 104 (e.g., in terms of the movement of the Tx node 102 relative to the Rx node 104) to eliminate the need for additional vector variables corresponding to the Rx node. For example, the velocity vector of the Tx node 102 in a global reference frame may be shifted according to the velocity vector of the Rx node 104, e.g.:

$$\vec{V'}_T = \vec{V}_T - \vec{V}_R$$

where $\vec{V'}_T$ is the velocity vector of the Tx node in the inertial reference frame of the Rx node and $\vec{V}_T$, $\vec{V}_R$ are respectively the velocity vectors of the Tx node and the Rx node in the Earth reference frame. In embodiments, either or both of the Tx node 102 and Rx node 104 may accordingly compensate for their own velocity vectors relative to the Earth and convert any relevant velocity vectors and relative velocity distributions into a global reference frame, e.g., for distribution throughout the multi-node communications network 100. In addition, while the representation of the relative motion between the Tx and Rx nodes 102, 104 is here presented in two dimensions, the relative motion (and, e.g., any associated velocity vectors, angular directions, Doppler nulling directions, and other parameters) may be presented in three dimensions with the addition of vertical/z-axis components.

In some embodiments, the Rx node 104 may assess and determine Doppler effects due to the relative motion of the Tx node 102 by measuring time differential points (TDP) rather than FSPs. For example, a signal transmitted at 1 kHz by the Tx node 102 may be subject to 10 Hz of Doppler frequency shift. This one-percent (1%) change in frequency may be alternatively expressed as a differential of one percent in the time required to measure a cycle of the transmitted signal (or, e.g., any arbitrary number of cycles). The Doppler effect may be precisely and equivalently characterized in either the frequency domain or the time domain. For example, graphs which plot the velocity vector of the Tx node 102 relative to the Rx node 104, 104a-c (y-axis) against the Doppler nulling angle ϕ, may remain consistent between the frequency domain and the time domain, with the exception that each FSP corresponds to a measured time differential at a given Doppler nulling angle ϕ (e.g., to a TDP) rather than to a measured frequency shift at that nulling angle.

In some embodiments, due to the nature of the transmitted signal (or, e.g., other conditions) it may be easier or more advantageous for the Rx node 104 to determine the Doppler shift in the time domain rather than in the frequency domain. For example, when the signal transmitted by the Tx node 102 at a given Doppler nulling direction consists of a series of short pulses and a long pulse repetition interval (e.g., as opposed to, e.g., a continuous short-duration pulse), the Rx node 104 may instead determine the Doppler shift to be resolved by measuring the time differential between received cycles of the transmitted signal and generating time differential profiles based on each determined set of TDPs. As the resulting time differential profiles plot the relative velocity vector of the Tx node 102 over a set of Doppler nulling angles 4) similarly to the frequency shift profile graphs, the same information can be determined by the Rx node 104.

The transmitter node 102 and the receiver node 104 can be time synchronized to apply Doppler correction respectively for their own motions relative to a common inertial reference frame. As a transmit angle advances, a receive angle retreats by a same amount as the transmit angle advance. This can be understood by first considering a transmitter node 102 when the transmitter node 102 applies full Doppler correction in the transmitter node's 102 direction of travel. Next, consider a receiver node 104 directly in line with the path of travel for the transmitter node 102. If the receiver node 104 at the same time similarly applies Doppler correction for the receiver node's 104 motion in line with the transmitter node 102, then at least a near-zero Doppler path (e.g., a near-zero Doppler path or a zero Doppler path) will exist from the transmitter node 102 to the receiver node 104. As shown in FIG. 6, this concept is shown with an arbitrary angle ϕ when both the receiver node 104 and the transmitter node 102 utilize the same reference frame.

When both the receiver node 104 and the transmitter node apply such synchronized Doppler correction relative to the common inertial reference frame, then the Doppler correction can be swept through a plurality of (e.g., some or all) angles so that a zero Doppler path or near-zero Doppler path will exist from the transmitter node 102 to the receiver node 104 including the angle resulting in the near-zero Doppler path or the zero Doppler path. A zero Doppler path has zero net frequency offset. For example, an angle resulting in the near-zero Doppler path may be an angle that is within 5 degrees of the angle resulting in the zero Doppler path. For any combination of the transmitter node 102 and the receiver node 104 motions and locations, there exists a zero-Doppler path when the Doppler correction angle is equal to the direction angle ϕ. Hence, a zero-Doppler path will be available between the transmitter node 102 and the receiver node 104 when the two are synchronized to apply Doppler correction for a swept angle ϕ, relative to the inertial reference, as illustrated in FIG. 6. Neither the transmitter node 102 nor the receiver node 104 need to know a direction to the other node in advance.

In some embodiments, the transmitter node 102 may be configured to apply the Doppler corrections relative to the stationary common inertial reference frame for a plurality of (e.g., some or all) azimuthal angles across a multi-pulse Doppler group such that each direction along one of the plurality of the azimuthal angles has a zero or near-zero Doppler time interval that would be known to the receiver node based on the time synchronization. The receiver node 104 may be configured to apply the Doppler corrections relative to the stationary common inertial reference frame for the plurality of the azimuthal angles across the multi-pulse Doppler group. The receiver node 104 may be configured to apply the Doppler corrections in an inverse fashion as compared to the transmitter node's 102 application of the Doppler corrections. The receiver node 104 may be further configured to receive a zero or near-zero Doppler pulse along a zero or near-zero Doppler path from the transmitter node 102 to the receiver node 104 with known time intervals. For example, a near-zero Doppler pulse may be a pulse of the multi-pulse Doppler group that is closest to a hypothetical zero Doppler pulse.

In some embodiments, the Doppler corrections are in both the frequency domain and the time domain. In some embodiments, the zero or near-zero Doppler path is unknown to the transmitter node 102 and the receiver node 104 prior to transmission of the multi-pulse Doppler group. In some embodiments, the receiver node 104 is further configured to coherently detect across relatively long correlation sequences (e.g., as compared to relatively shorter correlation sequences). In some embodiments, with time corrected pulse-to-pulse, pulse-to-pulse Doppler dispersion is non-existent. In some embodiments, based at least on the non-existent pulse-to-pulse Doppler dispersion, the receiver node 104 has an increased sensitivity of signals from the transmitter node 102 as compared to a sensitivity of signals when the receiver node 104 experiences pulse-to-pulse Doppler dispersion. In some embodiments, based at least on the non-existent pulse-to-pulse Doppler dispersion, the receiver node 104 is further configured for deep-noise detection. Deep-noise discovery, as used herein, refers to finding signals so buried under noise that signal power is less than, for example, 1 percent of noise power (an equivalent signal-to-noise ratio (SNR) can be stated as −20 decibels (dB)). Employing this technique appears useful for very low SNR conditions where signal power levels of 0.1%, 0.01% or less (relative to noise) may be common. In some embodiments, the receiver node 104 is further configured to correct Doppler time-error for subsequent pulses. In some embodiments, the receiver node 104 is further configured to additively combine pulse-to-pulse correlation scores to further improve sensitivity of the signals from the transmitter node 102.

In some embodiments, the stationary common inertial reference frame is a two-dimensional (2D) stationary common inertial reference frame or a three-dimensional (3D) stationary common inertial reference frame.

In some embodiments, the at least one antenna element 112 of the transmitter node 102 comprises at least one of at least one directional antenna element or at least one omnidirectional antenna element. In some embodiments, the at least one antenna element 112 of the receiver node 104 comprises at least one of at least one directional antenna element or at least one omnidirectional antenna element.

It should be noted that the term aircraft, as utilized herein, may include any manned or unmanned object capable of flight. Examples of aircraft may include, but are not limited to, fixed-wing aerial vehicles (e.g., propeller-powered, jet-powered), rotary-wing aerial vehicles (e.g., helicopters), manned aircraft, unmanned aircraft (e.g., unmanned aerial vehicles, or AUVs), etc. The aircraft may include may include a mobile platform such as precision guided equipment, machinery, vehicles, or aircraft including manned (e.g., passenger, cargo, tactical, etc.) and unmanned (e.g., unmanned aerial vehicles (UAVs) or unmanned aircraft systems (UASs)) aircraft, water, naval, land-based, or other similar vehicles, vessels, or machinery. Additionally, ground-based vehicles and/or water-based vehicles, as utilized herein, may refer to any type of vehicles (e.g., manned or unmanned) or other objects capable of traveling on ground terrain and/or water, respectively.

Although much of the present disclosure is directed to MANETs or other communication networks with a mix of mobile and stationary nodes utilizing DNS, this is not intended as a limitation of the present disclosure. It is also contemplated that DNS may be used with other applications, such as aircraft beacons used to help the aircraft find airports. The DNS may also be used in radar systems. The radar systems may utilize transmissions with the DNS protocol. For example, the transmissions may include time of arrival radar transmissions.

In some embodiments, DNS and DNSA includes adjusting the frequency of preambles of special DNS and/or DNSA transmissions to determine relative bearing. Depending upon the duty cycle of Special DNS or DNSA transmission, these transmissions consume spectrum resources that could otherwise be used to carry traffic while reducing the duty cycle increases the amount of time it takes DNS/DNSA to converge. In some embodiments, DNS or DNSA may be performed on wireless traffic instead of, or in addition to, special DNS/DNSA transmissions. For example, the body of the transmissions may be used for DNS and/or DNSA instead of, or in addition to, the preambles of the transmission. The DNS over the body may reduce the duty cycle needed for special DNS/DNSA transmissions, thus reducing spectrum overhead. DNS over the body may increases the number of DNS/DNSA events that are overlaid onto traffic transmissions, thus increasing the number of DNS/DNSA measurements per time thus speeding up DNS/DNSA convergence. The traffic transmissions may include mobile ad hoc network (MANET) traffic transmissions such as Internet Protocol (IP) packets, MANET control transmissions such as Optimized Link State Routing (OLSR) protocol packets.

The transmitter nodes 102 may transmit packets and the receiver nodes 104 may receive the packets. The packets may be considered wireless traffic between the transmitter nodes 102 and the receiver nodes 104. In embodiments, each of the packets is a fixed-frequency transmission. It is further contemplated that each of the packets may be a frequency-hopped transmission.

In embodiments, the packets are transmitted and received as radio frequency (RF) symbols. The receiver node 104 may receive the RF symbols and convert the RF symbols to digital RF symbols (e.g., by an analog-to-digital converter (ND converter) in an RF front end of the receiver node 104). The RF signals may also be down-converted from a received frequency to a signal at a baseband frequency. The signal at the baseband frequency may include I/Q signals, in which "I" is the amplitude of the in-phase carrier and "Q" is the amplitude of the quadrature-phase carrier. The I/Q signals may be demodulated to decode the user traffic. Each of the symbols may include a specific phase, magnitude, and frequency. The phase, magnitude, and frequency of the symbols may be modulated according to the modulation scheme. For example, in-phase (I) and quadrature (Q) may be mapped to a number (n) of symbols corresponding to a bit sequency in a constellation map or diagram. The number of bits per symbol may include, but is not limited to, 4, 8, 16, 32, 64, 128, any number of bits per symbols therein, or a larger number of bits per symbol. As may be understood, the number of bits per symbols may be based, at least in part, on the type of modulation scheme by which the signal is transmitted.

In embodiments, the packets are single-carrier modulated. In a single-carrier modulation mode, all symbols may be contiguous such that each synchronization burst are spaced in time and can be placed in any of the free channels by frequency hopping. Although not depicted, it is further contemplated that the packets may be multi-carrier modulated. In a multi-carrier modulation mode, the symbols can be contiguous or separated in frequency.

The packets include a preamble and a body payload. The packets may optionally include a midamble and/or a postamble. Each of the preamble, body payload, midamble, and/or postamble is formed of one or more of the symbols. In embodiments, the frequency of one or more of the symbols may be doppler nulled according to the doppler nulling protocol, in accordance with any of the methods previously described herein. The symbols of any of the preamble, body payload, midamble, and/or postamble may be doppler nulled at separate bearing reference directions.

The transmitter node 102 and receiver node 104 may implement the frequency-hopped transmission via one or more transmission security (TRANSEC) protocols and/or according to a pseudo-random (PN) pattern to mitigate frequency fading.

The DNS/DNSA protocols may be implemented in newly designed waveforms. In addition to newly design waveforms, legacy waveforms may be modified so that unmodified and modified transceivers can continue to interoperate.

During transition from not using DNS to using DNS on legacy waveforms, the older (unmodified) radio/modems will continue to operate but suffer a slight degradation due to the DNS doppler shifts. Thus, frequency-hopped receivers may continue to operate using the DNS-updated legacy waveforms in a backwards compatible manner.

In another embodiment, a system may include a controller. In one embodiment, controller includes one or more processors and memory. In another embodiment, the one or more processors may be configured to execute a set of program instructions stored in memory, wherein the set of program instructions are configured to cause the one or more processors to carry out the steps of the present disclosure.

In one embodiment, the one or more processors may include any one or more processing elements known in the art. In this sense, the one or more processors may include any microprocessor-type device configured to execute software algorithms and/or instructions. In one embodiment, the one or more processors may include a desktop computer, mainframe computer system, workstation, image computer, parallel processor, or other computer system (e.g., networked computer) configured to execute a program configured to operate the system, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors. In general, the term "processor" may be broadly defined to encompass any device having one or more processing elements, which execute program instructions from memory. Moreover, different subsystems of the system (e.g., controller) may include processor or logic elements suitable for carrying out at least a portion of the steps described throughout the present disclosure. Therefore, the above description should not be interpreted as a limitation on the present disclosure but merely an illustration.

The memory may include any storage medium known in the art suitable for storing program instructions executable by the associated one or more processors and the data received. For example, the memory may include a non-transitory memory medium. For instance, the memory may include, but is not limited to, a read-only memory (ROM), a random-access memory (RAM), a magnetic or optical memory device (e.g., disk), a magnetic tape, a solid-state drive and the like. In another embodiment, the memory is configured to store data. It is further noted that memory may be housed in a common controller housing with the one or more processors. In an alternative embodiment, the memory may be located remotely with respect to the physical location of the processors, controller, and the like. In another embodiment, the memory maintains program instructions for causing the one or more processors to carry out the various steps described through the present disclosure.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be affected, none of which is inherently superior to the other in that any vehicle to be utilized is a choice dependent upon the context in which the vehicle will be deployed and the specific concerns (e.g., speed, flexibility, or predictability) of the implementer, any of which may vary.

Transmission of a digital signal using continuous bandpass limited signals is also done using any combination of modulation of amplitude, frequency or phase of the sinusoidal carrier wave. The modulating waveform may consist of rectangular pulses, and the modulated parameters, which can be termed symbols, can be switched or keyed from one discrete value to another, using binary or M-ary amplitude-shift keying (ASK), frequency-shift keying (FSK), phase-shift keying (PSK), and the like.

Methods of the present disclosure may be employed in software defined radio (SDR), which employs waveform modulation and demodulation schemes of the kind used in radio data transmission but on a software driven platform, including but not limited to Frequency Modulation (FM), Amplitude Modulation (AM), Single Side Band (SSB), Double Side Band (DSB), Vestigial Sideband (VSB), Frequency Shift Keying (FSK), Phase Shift Keying (PSK), Gaussian Minimum Shift Keying (GMSK), Quadrature Amplitude Modulation (QAM), Frequency Hopped Spread Spectrum (FHSS), Direct Sequence Spread Spectrum (DSSS), Orthogonal Frequency Division Multiplexing (OFDM) and the like.

Software defined radio (SDR) creates radios that function like computers, where the functionality of a radio is defined by software that can be upgraded, rather than by fixed hardware. SDR has been defined as a radio whose signal processing functionality is defined in software; where the waveforms are generated as sampled digital signals, converted from digital to analog via a high-speed Digital-to-Analog Converter (DAC) and then translated to Radio Frequency (RF) for wireless propagation to a receiver. The receiver typically employs an RF subsystem coupled to a high-speed Analog to Digital Converter (ADC) that can capture some or all of the channels of the software radio node. The receiver then extracts and demodulates the channel waveform using software executing on a digital processor.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period. For example, the memory may be random access memory (RAM), and the results may not necessarily persist indefinitely in the memory.

It is noted herein that the one or more components of system may be communicatively coupled to the various other components of system in any manner known in the art. For example, the one or more processors may be communicatively coupled to each other and other components via a wireline connection or wireless connection.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A system comprising:
 a transmitter node and a receiver node, wherein each node of the transmitter node and the receiver node comprises:
   a communications interface comprising at least one antenna element; and
   a controller operatively coupled to the communications interface, the controller including one or more processors, wherein the controller has information of own node velocity and own node orientation;
 wherein each node of the transmitter node and the receiver node are time synchronized to apply Doppler corrections associated with said node's own motions relative to a stationary common inertial reference frame;

wherein the stationary common inertial reference frame is known to the transmitter node and the receiver node prior to the transmitter node transmitting a plurality of signals to the receiver node and prior to the receiver node receiving the plurality of signals from the transmitter node;

wherein the receiver node is configured to digitize the plurality of signals using a step size, determine a modulation amplitude of the plurality of signals, and adjust the step size based on the modulation amplitude.

2. The system of claim 1, wherein the modulation amplitude is based on said node's own motions of the receiver node and the transmitter node.

3. The system of claim 2, wherein a doppler shift of the plurality of signals is between 1 Hz and 10 MHz.

4. The system of claim 1, wherein the receiver node is configured to iteratively digitize the plurality of signals using the step size, determine the modulation amplitude of the plurality of signals, and adjust the step size based on the modulation amplitude.

5. The system of claim 1, wherein one of the receiver node or the transmitter node is a low-earth orbit satellite.

6. The system of claim 1, wherein the transmitter node is configured to adjust a transmit frequency according to an own speed and an own velocity direction of the transmitter node so as to perform a transmitter-side Doppler correction; wherein the receiver node is configured to adjust a receiver frequency of the receiver node according to the own node velocity and the own node orientation so as to perform a receiver-side Doppler correction.

7. The system of claim 6, wherein an amount of adjustment of the adjusted transmit frequency is proportional to a transmitter node velocity projection onto a Doppler null direction, wherein an amount of adjustment of the adjusted receiver frequency is proportional to a receiver node velocity projection onto the Doppler null direction.

8. The system of claim 7, wherein the receiver node is configured to determine a relative speed between the transmitter node and the receiver node.

9. The system of claim 8, wherein the receiver node is configured to determine a direction that the transmitter node is in motion and a velocity vector of the transmitter node.

10. The system of claim 1, wherein the stationary common inertial reference frame is a two-dimensional (2D) stationary common inertial reference frame.

11. The system of claim 1, wherein the stationary common inertial reference frame is a three-dimensional (3D) stationary common inertial reference frame.

12. The system of claim 1, wherein the at least one antenna element comprises at least one of at least one directional antenna element or at least one omnidirectional antenna element.

13. A receiver node comprising:
a communications interface comprising at least one antenna element; and
a controller operatively coupled to the communications interface, the controller including one or more processors, wherein the controller has information of own node velocity and own node orientation;

wherein the receiver node is time synchronized with a transmitter node to apply Doppler corrections associated with said node's own motions relative to a stationary common inertial reference frame;

wherein the stationary common inertial reference frame is known to the transmitter node and the receiver node prior to the transmitter node transmitting a plurality of signals to the receiver node and prior to the receiver node receiving the plurality of signals from the transmitter node;

wherein the receiver node is configured to digitize the plurality of signals using a step size, determine a modulation amplitude of the plurality of signals, and adjust the step size based on the modulation amplitude.

14. The receiver node of claim 13, wherein the modulation amplitude is based on said node's own motions of the receiver node and the transmitter node.

15. The receiver node of claim 14, wherein a doppler shift of the plurality of signals is between 1 Hz and 10 MHz.

16. The receiver node of claim 13, wherein the receiver node is configured to iteratively digitize the plurality of signals using the step size, determine the modulation amplitude of the plurality of signals, and adjust the step size based on the modulation amplitude.

17. The receiver node of claim 13, wherein the transmitter node is configured to adjust a transmit frequency according to an own speed and an own velocity direction of the transmitter node so as to perform a transmitter-side Doppler correction; wherein the receiver node is configured to adjust a receiver frequency of the receiver node according to the own node velocity and the own node orientation so as to perform a receiver-side Doppler correction.

18. The receiver node of claim 17, wherein an amount of adjustment of the adjusted transmit frequency is proportional to a transmitter node velocity projection onto a Doppler null direction, wherein an amount of adjustment of the adjusted receiver frequency is proportional to a receiver node velocity projection onto the Doppler null direction.

19. The receiver node of claim 18, wherein the receiver node is configured to determine a relative speed between the transmitter node and the receiver node.

20. The receiver node of claim 19, wherein the receiver node is configured to determine a direction that the transmitter node is in motion and a velocity vector of the transmitter node.

* * * * *